(12) United States Patent
Huizen et al.

(10) Patent No.: US 10,614,719 B2
(45) Date of Patent: Apr. 7, 2020

(54) EXTERIOR MIRROR WITH BLIND ZONE INDICATOR

(71) Applicant: MAGNA MIRRORS OF AMERICA, INC., Holland, MI (US)

(72) Inventors: Gregory A. Huizen, Hudsonville, MI (US); Mark E. Kramer, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 15/700,271

(22) Filed: Sep. 11, 2017

(65) Prior Publication Data

US 2017/0372614 A1     Dec. 28, 2017

Related U.S. Application Data

(63) Continuation of application No. 14/849,998, filed on Sep. 10, 2015, now Pat. No. 9,761,144.

(60) Provisional application No. 62/113,555, filed on Feb. 9, 2015, provisional application No. 62/049,077, filed on Sep. 11, 2014.

(51) Int. Cl.
    *G08G 1/16*      (2006.01)
    *B60R 1/12*      (2006.01)
(52) U.S. Cl.
    CPC ........... *G08G 1/167* (2013.01); *B60R 1/1207* (2013.01); *B60R 2001/1215* (2013.01)

(58) Field of Classification Search
    CPC .................. G08G 1/167; B60R 1/1207; B60R 2001/1215; B60R 1/06; B60R 1/0602; B60R 1/062; B60R 1/08
    See application file for complete search history.

(56) References Cited

U.S. PATENT DOCUMENTS

| | | | |
|---|---|---|---|
| 1,096,452 | A | 5/1914 | Perrin |
| 1,114,559 | A | 10/1914 | Weed |
| 1,563,258 | A | 11/1925 | Cunningham |
| 1,672,559 | A | 6/1928 | Doble |
| RE17,274 | E | 4/1929 | Porter |

(Continued)

FOREIGN PATENT DOCUMENTS

| | | |
|---|---|---|
| DE | 10054315 | 11/2000 |
| EP | 0310261 | 4/1989 |

(Continued)

*Primary Examiner* — Hongmin Fan
(74) *Attorney, Agent, or Firm* — Honigman LLP

(57) ABSTRACT

A mirror reflective element sub-assembly suitable for use for an exterior rearview mirror assembly of a vehicle includes a mirror reflective element, a mirror back plate, and a blind zone indication module. The blind zone indication module attaches at the rear side of the mirror reflective element via an aperture of the mirror back plate. The blind zone indication module includes a housing that houses the circuit element and the at least one light emitting diode therein. The rear side of the mirror back plate includes structure at the indicator receiving portion configured to at least partially receive the housing. The circuit element includes electrically conductive terminals that are in electrical connection with circuitry of the circuit element and that are received at a connector portion of the housing that is configured to connect to a wire harness of an exterior rearview mirror assembly.

16 Claims, 16 Drawing Sheets

(56) References Cited

U.S. PATENT DOCUMENTS

| | | |
|---|---|---|
| 2,010,138 A | 8/1935 | Condon |
| 2,135,262 A | 11/1938 | Schumacher |
| 2,263,382 A | 11/1941 | Gotzinger |
| 2,457,348 A | 12/1948 | Chambers |
| 2,514,989 A | 7/1950 | Buren |
| 2,561,582 A | 7/1951 | Marbel |
| 2,580,014 A | 12/1951 | Gazda |
| 2,636,419 A | 4/1953 | Kerr |
| 2,778,273 A | 1/1957 | Fellmeth |
| 2,911,177 A | 11/1959 | West |
| 3,104,274 A | 9/1963 | King |
| 3,131,250 A | 4/1964 | Ely |
| 3,146,296 A | 8/1964 | Fischer |
| 3,170,985 A | 2/1965 | Katulich |
| 3,175,463 A | 3/1965 | Seashore |
| 3,266,016 A | 8/1966 | Maruyama et al. |
| 3,267,806 A | 8/1966 | Azegami |
| 3,280,701 A | 10/1966 | Donnelly et al. |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer, Jr. |
| 3,610,739 A | 10/1971 | Seashore |
| 3,667,833 A | 6/1972 | Baldwin, Sr. |
| 3,708,222 A | 1/1973 | Stern |
| 3,764,201 A | 10/1973 | Haile |
| 3,806,232 A | 4/1974 | Gray |
| 3,826,563 A | 7/1974 | Davis |
| 3,881,811 A | 5/1975 | French |
| 3,887,788 A | 6/1975 | Seibel et al. |
| 3,909,117 A | 9/1975 | Takahashi et al. |
| 4,200,359 A | 4/1980 | Lawson |
| 4,223,983 A | 9/1980 | Bloom |
| 4,258,979 A | 3/1981 | Mahin |
| 4,264,144 A | 4/1981 | McCord |
| 4,268,120 A | 5/1981 | Jitsumori |
| 4,274,078 A | 6/1981 | Isobe et al. |
| 4,281,899 A | 8/1981 | Oskam |
| 4,293,191 A | 10/1981 | Kim |
| 4,303,308 A | 12/1981 | Kobrin |
| 4,306,770 A | 12/1981 | Marhauer |
| 4,311,362 A | 1/1982 | LaPorte |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,435,042 A | 3/1984 | Wood et al. |
| 4,436,371 A | 3/1984 | Wood et al. |
| 4,436,372 A | 3/1984 | Schmidt et al. |
| 4,439,013 A | 3/1984 | Hagn et al. |
| 4,449,786 A | 5/1984 | McCord |
| 4,470,665 A | 9/1984 | Blom |
| 4,499,451 A | 2/1985 | Suzuki et al. |
| 4,526,446 A | 7/1985 | Adams |
| 4,549,786 A | 10/1985 | Albers et al. |
| 4,555,166 A | 11/1985 | Enomoto |
| 4,575,202 A | 3/1986 | McGuire |
| 4,588,267 A | 5/1986 | Pastore |
| 4,609,266 A | 9/1986 | Blom |
| 4,623,222 A | 11/1986 | Itoh et al. |
| 4,629,296 A | 12/1986 | White |
| 4,630,904 A | 12/1986 | Pastore |
| 4,674,849 A | 6/1987 | Stewart |
| 4,674,850 A | 6/1987 | Blom |
| 4,678,294 A | 7/1987 | Van Nostrand |
| 4,679,906 A | 7/1987 | Brandenburg |
| 4,712,879 A | 12/1987 | Lynam et al. |
| 4,715,701 A | 12/1987 | Urban |
| 4,721,364 A | 1/1988 | Itoh et al. |
| 4,727,302 A | 2/1988 | Mizuta et al. |
| 4,733,335 A | 3/1988 | Serizawa et al. |
| 4,733,336 A | 3/1988 | Skogler et al. |
| 4,770,522 A | 9/1988 | Alten |
| 4,773,740 A | 9/1988 | Kawakami et al. |
| D297,926 S | 10/1988 | Kesler |
| 4,793,690 A | 12/1988 | Gahan et al. |
| 4,799,768 A | 1/1989 | Gahan |
| 4,803,599 A | 2/1989 | Trine et al. |
| 4,824,231 A | 4/1989 | Quintana |
| 4,826,289 A | 5/1989 | Vandenbrink et al. |
| 4,828,379 A | 5/1989 | Parsons et al. |
| 4,853,283 A | 8/1989 | Skolnick |
| 4,859,046 A | 8/1989 | Traynor et al. |
| 4,882,466 A | 11/1989 | Friel |
| 4,882,565 A | 11/1989 | Gallmeyer |
| 4,906,075 A | 3/1990 | Majsumiya |
| 4,906,085 A | 3/1990 | Sugihara et al. |
| 4,913,542 A | 4/1990 | Adolfsson |
| 4,917,477 A | 4/1990 | Bechtel et al. |
| 4,917,485 A | 4/1990 | Baldwin, Sr. |
| 4,929,074 A | 5/1990 | Urban |
| 4,931,627 A | 6/1990 | Watts |
| 4,932,769 A | 6/1990 | Goosen |
| 4,932,770 A | 6/1990 | Caravaty |
| 4,948,242 A | 8/1990 | Desmond et al. |
| 4,951,179 A | 8/1990 | Machida |
| 4,989,964 A | 2/1991 | Meise |
| 5,005,962 A | 4/1991 | Edelman |
| 5,014,167 A | 5/1991 | Roberts |
| 5,016,996 A | 5/1991 | Ueno |
| 5,017,903 A | 5/1991 | Krippelz, Sr. |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,059,015 A | 10/1991 | Tran |
| 5,066,112 A | 11/1991 | Lynam et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,080,492 A | 1/1992 | Platzer, Jr. |
| 5,107,374 A | 4/1992 | Lupo et al. |
| 5,115,346 A | 5/1992 | Lynam |
| 5,115,352 A | 5/1992 | do Espirito Santo |
| 5,118,540 A | 6/1992 | Hutchison |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,253,109 A | 10/1993 | O'Farrell et al. |
| 5,285,060 A | 2/1994 | Larson et al. |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,340,503 A | 8/1994 | Varaprasad et al. |
| 5,354,965 A | 10/1994 | Lee |
| 5,355,245 A | 10/1994 | Lynam |
| 5,355,284 A | 10/1994 | Roberts |
| 5,361,190 A | 11/1994 | Roberts et al. |
| 5,371,659 A | 12/1994 | Pastrick et al. |
| 5,402,103 A | 3/1995 | Tashiro |
| 5,406,414 A | 4/1995 | O'Farrell et al. |
| 5,412,512 A | 5/1995 | Zebold et al. |

(56) References Cited

U.S. PATENT DOCUMENTS

| | | |
|---|---|---|
| 5,424,875 A | 6/1995 | Davis, II |
| 5,432,643 A | 7/1995 | Huang |
| 5,436,741 A | 7/1995 | Crandall |
| 5,437,931 A | 8/1995 | Tsai et al. |
| 5,438,487 A | 8/1995 | Schmid et al. |
| 5,446,576 A | 8/1995 | Lynam et al. |
| 5,448,397 A | 9/1995 | Tonar |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,509,606 A | 4/1996 | Breithaupt et al. |
| 5,517,367 A | 5/1996 | Kim et al. |
| 5,523,877 A | 6/1996 | Lynam |
| 5,525,264 A | 6/1996 | Cronin et al. |
| 5,526,195 A | 6/1996 | Thomas |
| 5,528,422 A | 6/1996 | Roberts |
| 5,530,588 A | 6/1996 | Vivier |
| 5,535,056 A | 7/1996 | Caskey et al. |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |
| 5,575,552 A | 11/1996 | Faloon et al. |
| 5,579,133 A | 11/1996 | Black et al. |
| 5,587,236 A | 12/1996 | Agrawal et al. |
| 5,587,699 A | 12/1996 | Faloon et al. |
| 5,594,222 A | 1/1997 | Caldwell |
| 5,594,593 A | 1/1997 | Milner |
| 5,610,756 A | 3/1997 | Lynam et al. |
| 5,619,374 A | 4/1997 | Roberts |
| 5,619,375 A | 4/1997 | Roberts |
| 5,621,569 A | 4/1997 | Schlenke |
| 5,621,577 A | 4/1997 | Lang et al. |
| 5,632,551 A | 5/1997 | Roney et al. |
| 5,644,442 A | 7/1997 | Lemere |
| 5,649,756 A | 7/1997 | Adams et al. |
| 5,659,423 A | 8/1997 | Schierbeek et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,689,370 A | 11/1997 | Tonar et al. |
| 5,691,855 A | 11/1997 | Lupkas |
| 5,715,093 A | 2/1998 | Schierbeek et al. |
| 5,722,836 A | 3/1998 | Younker |
| 5,724,187 A | 3/1998 | Varaprasad et al. |
| 5,751,489 A | 5/1998 | Caskey et al. |
| D394,833 S | 6/1998 | Muth |
| 5,760,962 A | 6/1998 | Schofield et al. |
| 5,784,211 A | 7/1998 | Mingledorff |
| 5,786,772 A | 7/1998 | Schofield et al. |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,094 A | 8/1998 | Schofield et al. |
| 5,796,176 A | 8/1998 | Kramer et al. |
| 5,796,532 A | 8/1998 | Kanazawa |
| 5,798,575 A | 8/1998 | O'Farrell et al. |
| 5,803,579 A | 9/1998 | Turnbull et al. |
| 5,805,367 A | 9/1998 | Kanazawa |
| 5,808,777 A | 9/1998 | Lynam et al. |
| 5,818,625 A | 10/1998 | Forgette et al. |
| 5,823,654 A | 10/1998 | Pastrick et al. |
| 5,825,527 A | 10/1998 | Forgette et al. |
| 5,835,294 A | 11/1998 | Minegishi |
| 5,838,505 A | 11/1998 | Palathingal |
| 5,847,889 A | 12/1998 | Komiyama et al. |
| 5,863,116 A | 1/1999 | Pastrick et al. |
| 5,864,434 A | 1/1999 | Taylor |
| 5,877,897 A | 3/1999 | Schofield et al. |
| 5,879,074 A | 3/1999 | Pastrick |
| D409,540 S | 5/1999 | Muth |
| 5,900,999 A | 5/1999 | Huizenga et al. |
| 5,910,854 A | 6/1999 | Varaprasad et al. |
| 5,922,176 A | 7/1999 | Caskey |
| 5,923,457 A | 7/1999 | Byker et al. |
| 5,929,786 A | 7/1999 | Schofield et al. |
| 5,938,320 A | 8/1999 | Crandall |
| 5,959,367 A | 9/1999 | O'Farrell et al. |
| 5,980,050 A | 11/1999 | McCord |
| 5,986,364 A | 11/1999 | Bingle et al. |
| 6,001,486 A | 12/1999 | Varaprasad et al. |
| 6,002,511 A | 12/1999 | Varaprasad et al. |
| 6,005,724 A | 12/1999 | Todd |
| 6,007,207 A | 12/1999 | Liu |
| 6,007,222 A | 12/1999 | Thau |
| 6,030,084 A | 2/2000 | Schmidt |
| 6,032,323 A | 3/2000 | Smith et al. |
| 6,033,078 A | 3/2000 | Su et al. |
| 6,045,243 A | 4/2000 | Muth et al. |
| D425,466 S | 5/2000 | Todd et al. |
| 6,064,508 A | 5/2000 | Forgette et al. |
| 6,065,840 A | 5/2000 | Caskey et al. |
| D426,506 S | 6/2000 | Todd et al. |
| D426,507 S | 6/2000 | Todd et al. |
| D427,128 S | 6/2000 | Mathieu |
| 6,074,068 A | 6/2000 | Palathingal |
| 6,074,077 A | 6/2000 | Pastrick et al. |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,099,155 A | 8/2000 | Pastrick et al. |
| 6,102,546 A | 8/2000 | Carter |
| 6,109,586 A | 8/2000 | Hock |
| 6,111,683 A | 8/2000 | Cammenga et al. |
| 6,111,684 A | 8/2000 | Forgette et al. |
| 6,116,743 A | 9/2000 | Hoek |
| 6,124,647 A | 9/2000 | Marcus et al. |
| 6,124,886 A | 9/2000 | DeLine et al. |
| 6,132,072 A | 10/2000 | Turnbull et al. |
| 6,142,656 A | 11/2000 | Kurth |
| 6,146,003 A | 11/2000 | Thau |
| 6,149,287 A | 11/2000 | Pastrick et al. |
| 6,152,590 A | 11/2000 | Furst et al. |
| 6,154,306 A | 11/2000 | Varaprasad et al. |
| 6,163,083 A | 12/2000 | Kramer et al. |
| 6,164,564 A | 12/2000 | Franco et al. |
| 6,166,848 A | 12/2000 | Cammenga et al. |
| 6,170,956 B1 | 1/2001 | Rumsey et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,993 B1 | 3/2001 | Mou |
| 6,201,642 B1 | 3/2001 | Bos |
| 6,206,553 B1 | 3/2001 | Boddy et al. |
| 6,207,083 B1 | 3/2001 | Varaprasad et al. |
| 6,213,612 B1 | 4/2001 | Schnell et al. |
| 6,227,689 B1 | 5/2001 | Miller |
| 6,229,226 B1 | 5/2001 | Kramer et al. |
| 6,229,435 B1 | 5/2001 | Knapp et al. |
| 6,239,898 B1 | 5/2001 | Byker et al. |
| 6,243,218 B1 | 6/2001 | Whitehead |
| 6,244,716 B1 | 6/2001 | Steenwyk et al. |
| 6,245,262 B1 | 6/2001 | Varaprasad et al. |
| 6,250,148 B1 | 6/2001 | Lynam |
| 6,257,746 B1 | 7/2001 | Todd et al. |
| 6,260,608 B1 | 7/2001 | Kim |
| 6,264,353 B1 | 7/2001 | Carraher et al. |

(56) References Cited

U.S. PATENT DOCUMENTS

| | | |
|---|---|---|
| 6,270,225 B1 | 8/2001 | Goolsby |
| 6,276,821 B1 | 8/2001 | Pastrick et al. |
| 6,280,069 B1 | 8/2001 | Pastrick et al. |
| 6,286,965 B1 | 9/2001 | Caskey et al. |
| 6,294,989 B1 | 9/2001 | Schofield et al. |
| 6,296,379 B1 | 10/2001 | Pastrick |
| 6,299,333 B1 | 10/2001 | Pastrick et al. |
| 6,310,611 B1 | 10/2001 | Caldwell |
| 6,310,738 B1 | 10/2001 | Chu |
| 6,313,454 B1 | 11/2001 | Bos et al. |
| 6,315,419 B1 | 11/2001 | Platzer, Jr. |
| 6,318,870 B1 | 11/2001 | Spooner et al. |
| 6,320,282 B1 | 11/2001 | Caldwell |
| 6,329,925 B1 | 12/2001 | Skiver et al. |
| 6,335,548 B1 | 1/2002 | Roberts et al. |
| 6,336,737 B1 | 1/2002 | Thau |
| 6,340,849 B1 | 1/2002 | Kramer et al. |
| 6,340,850 B2 | 1/2002 | O'Farrell et al. |
| 6,341,523 B2 | 1/2002 | Lynam |
| 6,343,402 B1 | 2/2002 | Smith et al. |
| 6,347,880 B1 | 2/2002 | Furst et al. |
| 6,353,392 B1 | 3/2002 | Schofield et al. |
| 6,356,376 B1 | 3/2002 | Tonar et al. |
| 6,359,274 B1 | 3/2002 | Nixon et al. |
| 6,362,548 B1 | 3/2002 | Bingle et al. |
| 6,363,326 B1 | 3/2002 | Scully |
| 6,379,013 B1 | 4/2002 | Bechtel et al. |
| 6,390,632 B1 | 5/2002 | Palathingal |
| 6,396,397 B1 | 5/2002 | Bos et al. |
| 6,398,377 B1 | 6/2002 | Chou |
| 6,402,328 B1 | 6/2002 | Bechtel et al. |
| 6,416,208 B2 | 7/2002 | Pastrick et al. |
| 6,420,036 B1 | 7/2002 | Varaprasad et al. |
| 6,426,485 B1 | 7/2002 | Bulgajewski et al. |
| 6,428,172 B1 | 8/2002 | Hutzel et al. |
| 6,441,943 B1 | 8/2002 | Roberts et al. |
| 6,441,964 B1 | 8/2002 | Chu et al. |
| 6,445,287 B1 | 9/2002 | Schofield et al. |
| 6,447,130 B2 | 9/2002 | Chu |
| 6,449,082 B1 | 9/2002 | Agrawal et al. |
| 6,467,920 B2 | 10/2002 | Schnell et al. |
| 6,471,362 B1 | 10/2002 | Carter et al. |
| 6,472,979 B2 | 10/2002 | Schofield et al. |
| 6,476,358 B1 | 11/2002 | Lang et al. |
| 6,498,620 B2 | 12/2002 | Schofield et al. |
| 6,501,387 B2 | 12/2002 | Skiver et al. |
| 6,504,142 B2 | 1/2003 | Nixon et al. |
| 6,511,192 B1 | 1/2003 | Henion et al. |
| 6,512,624 B2 | 1/2003 | Tonar et al. |
| 6,521,916 B2 | 2/2003 | Roberts et al. |
| 6,522,451 B1 | 2/2003 | Lynam |
| 6,523,976 B1 | 2/2003 | Turnbull et al. |
| 6,537,138 B2 | 3/2003 | Ohmori et al. |
| 6,582,109 B2 | 6/2003 | Miller |
| 6,595,649 B2 | 7/2003 | Hoekstra et al. |
| 6,598,980 B2 | 7/2003 | Marusawa et al. |
| 6,598,982 B2 | 7/2003 | Witt |
| 6,612,708 B2 | 9/2003 | Chu |
| 6,615,438 B1 | 9/2003 | Franco |
| 6,616,314 B2 | 9/2003 | Thau |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,650,457 B2 | 11/2003 | Busscher et al. |
| 6,657,767 B2 | 12/2003 | Bonardi et al. |
| 6,669,109 B2 | 12/2003 | Ivanov et al. |
| 6,669,267 B1 | 12/2003 | Lynam et al. |
| 6,685,864 B2 | 2/2004 | Bingle et al. |
| 6,690,268 B2 | 2/2004 | Schofield et al. |
| 6,700,692 B2 | 3/2004 | Tonar et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,731,205 B2 | 5/2004 | Schofield et al. |
| 6,737,629 B2 | 5/2004 | Nixon et al. |
| 6,742,904 B2 | 6/2004 | Bechtel et al. |
| 6,755,544 B2 | 6/2004 | Schnell et al. |
| 6,757,109 B2 | 6/2004 | Bos |
| D493,131 S | 7/2004 | Lawlor et al. |
| D493,394 S | 7/2004 | Lawlor et al. |
| 6,824,281 B2 | 11/2004 | Schofield et al. |
| 6,831,268 B2 | 12/2004 | Bechtel et al. |
| 6,902,284 B2 | 6/2005 | Hutzel et al. |
| 6,916,100 B2 | 7/2005 | Pavao |
| 6,919,796 B2 | 7/2005 | Boddy et al. |
| 6,932,483 B2 | 8/2005 | Strumolo et al. |
| 6,979,090 B1 | 12/2005 | Wnuk |
| 7,004,593 B2 | 2/2006 | Weller et al. |
| 7,073,914 B2 | 7/2006 | Pavao |
| 7,080,914 B1 | 7/2006 | Boddy |
| 7,097,312 B2 | 8/2006 | Platzer, Jr. |
| 7,106,392 B2 | 9/2006 | You |
| 7,126,456 B2 | 10/2006 | Boddy et al. |
| 7,167,294 B2 | 1/2007 | Lynam et al. |
| 7,167,796 B2 | 1/2007 | Taylor et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,267,448 B2 | 9/2007 | Schmidt et al. |
| 7,274,501 B2 | 9/2007 | McCabe et al. |
| 7,289,037 B2 | 10/2007 | Uken et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,334,922 B2 | 2/2008 | Bonardi et al. |
| 7,338,177 B2 | 3/2008 | Lynam |
| 7,339,149 B1 | 3/2008 | Schofield et al. |
| 7,342,707 B2 | 3/2008 | Roberts et al. |
| 7,345,680 B2 | 3/2008 | David |
| 7,349,143 B2 | 3/2008 | Tonar et al. |
| 7,372,611 B2 | 3/2008 | Tonar et al. |
| 7,370,983 B2 | 5/2008 | DeWind et al. |
| 7,391,563 B2 | 6/2008 | McCabe et al. |
| 7,400,435 B2 | 7/2008 | Byers et al. |
| 7,420,756 B2 | 9/2008 | Lynam |
| 7,423,522 B2 | 9/2008 | O'Brien et al. |
| 7,492,281 B2 | 2/2009 | Lynam et al. |
| 7,517,099 B2 | 4/2009 | Hannah |
| 7,526,103 B2 | 4/2009 | Schofield et al. |
| 7,581,859 B2 | 9/2009 | Lynam |
| 7,626,749 B2 | 12/2009 | Baur et al. |
| 7,636,188 B2 | 12/2009 | Baur et al. |
| 7,720,580 B2 | 5/2010 | Higgins-Luthman |
| 7,748,856 B2 | 7/2010 | Zhao |
| 7,760,111 B2 | 7/2010 | Lynam et al. |
| 7,824,045 B2 | 11/2010 | Zhao |
| 7,880,596 B2 | 2/2011 | Lynam et al. |
| 7,881,496 B2 | 2/2011 | Camilleri et al. |
| 7,887,204 B2 | 2/2011 | Zhao |
| 7,934,844 B1 | 5/2011 | Zhao |
| 7,944,371 B2 | 5/2011 | Foote et al. |
| 8,058,977 B2 | 11/2011 | Lynam |
| 8,102,279 B2 | 1/2012 | Foote et al. |
| 8,164,482 B2 | 4/2012 | Lynam et al. |
| 8,242,896 B2 | 8/2012 | Lynam |
| 8,287,164 B2 | 10/2012 | Fehn et al. |
| 8,466,779 B2 | 6/2013 | Lynam |
| 8,466,780 B2 | 6/2013 | Lynam et al. |
| 8,786,704 B2 | 7/2014 | Foote et al. |
| 9,035,754 B2 | 5/2015 | Lynam |
| 9,761,144 B2 | 9/2017 | Huizen et al. |
| 2002/0036828 A1 | 3/2002 | Wong |
| 2002/0105741 A1 | 8/2002 | Platzer, Jr. |
| 2002/0159169 A1 | 10/2002 | McCord |
| 2002/0159270 A1 | 10/2002 | Lynam et al. |
| 2003/0043589 A1 | 3/2003 | Blank |
| 2003/0117728 A1* | 6/2003 | Hutzel ............ B60R 1/008 359/838 |
| 2003/0117731 A1 | 6/2003 | Platzer, Jr. |
| 2004/0032638 A1 | 2/2004 | Tonar et al. |
| 2004/0032675 A1 | 2/2004 | Weller et al. |
| 2004/0032676 A1 | 2/2004 | Drummond et al. |

(56) References Cited

U.S. PATENT DOCUMENTS

| | | |
|---|---|---|
| 2004/0165291 A1 | 8/2004 | Platzer, Jr. |
| 2004/0264011 A1* | 12/2004 | Lynam |
| 2005/0078389 A1 | 4/2005 | Kulas et al. |
| 2005/0134983 A1 | 6/2005 | Lynam |
| 2005/0248859 A1 | 11/2005 | Platzer, Jr. |
| 2006/0050018 A1 | 3/2006 | Hutzel et al. |
| 2006/0056086 A1 | 3/2006 | Hannah |
| 2006/0061008 A1 | 3/2006 | Karner et al. |
| 2006/0125919 A1 | 6/2006 | Camilleri et al. |
| 2006/0126150 A1 | 6/2006 | Tonar et al. |
| 2006/0171704 A1 | 8/2006 | Bingle et al. |
| 2006/0181772 A1 | 8/2006 | Byers et al. |
| 2006/0268440 A1 | 11/2006 | Platzer, Jr. |
| 2007/0058257 A1* | 3/2007 | Lynam ............ B60Q 1/2665 359/604 |
| 2007/0285789 A1 | 12/2007 | Lindahl et al. |
| 2008/0212189 A1 | 9/2008 | Baur et al. |
| 2008/0225421 A1 | 9/2008 | Platzer |
| 2008/0304170 A1 | 12/2008 | Zhao |
| 2009/0040306 A1 | 2/2009 | Foote et al. |
| 2009/0115631 A1 | 5/2009 | Foote et al. |
| 2009/0237820 A1 | 9/2009 | McCabe et al. |
| 2010/0026475 A1 | 2/2010 | Hwang |
| 2010/0039691 A1 | 2/2010 | Thomas et al. |
| 2010/0110523 A1* | 5/2010 | Varaprasad ............ B60R 1/089 359/273 |
| 2010/0321757 A1 | 12/2010 | Cammenga et al. |
| 2011/0260845 A1 | 10/2011 | Henion et al. |
| 2013/0279033 A1* | 10/2013 | Lynam ................ B60R 1/1207 359/843 |

FOREIGN PATENT DOCUMENTS

| | | | | |
|---|---|---|---|---|
| EP | 0551802 | 1/1992 | | |
| EP | 0443185 | 2/1995 | | |
| FR | 2551005 | 3/1985 | | |
| GB | 1172382 | 11/1969 | | |
| GB | 2161440 | 1/1986 | | |
| JP | 491539 | 8/1992 | | |
| JP | 08268188 | 10/1996 | | |
| JP | 0681836 | 3/1997 | | |
| WO | WO 2001081956 | 11/2001 | | |
| WO | WO 2004026633 | 4/2004 | | |
| WO | WO 2004103772 | 12/2004 | | |
| WO | WO 2005086777 | 9/2005 | | |
| WO | WO 2006017019 | 2/2006 | | |
| WO | WO 2006124682 | 11/2006 | | |
| WO | WO 2007005942 | 1/2007 | | |
| WO | WO 2008051910 | 5/2008 | | |
| WO | WO 2004/103772 | * | 4/2012 | ............ B60R 1/12 |

* cited by examiner

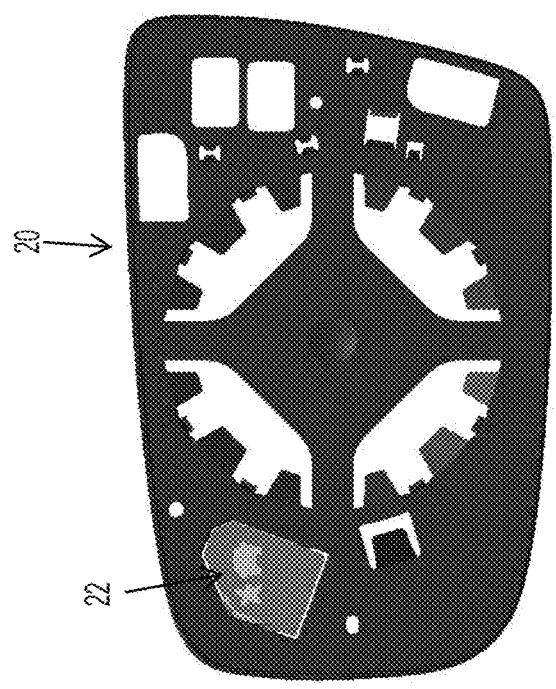
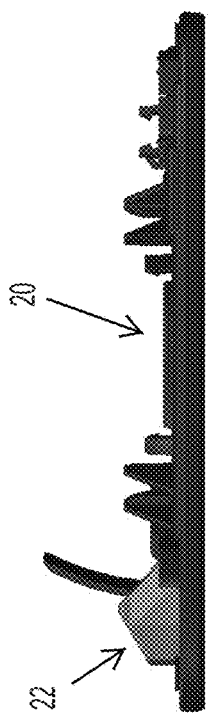
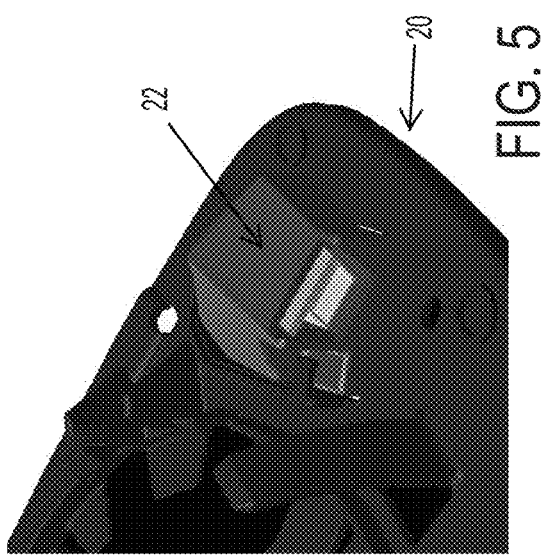
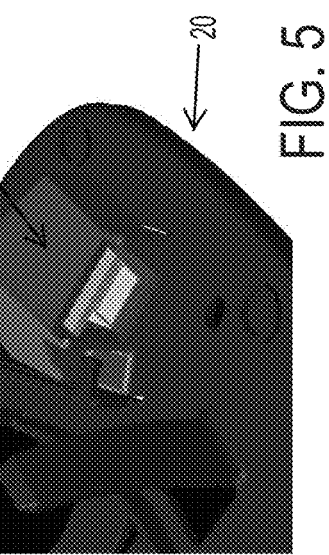
FIG. 2
FIG. 3
FIG. 4
FIG. 5

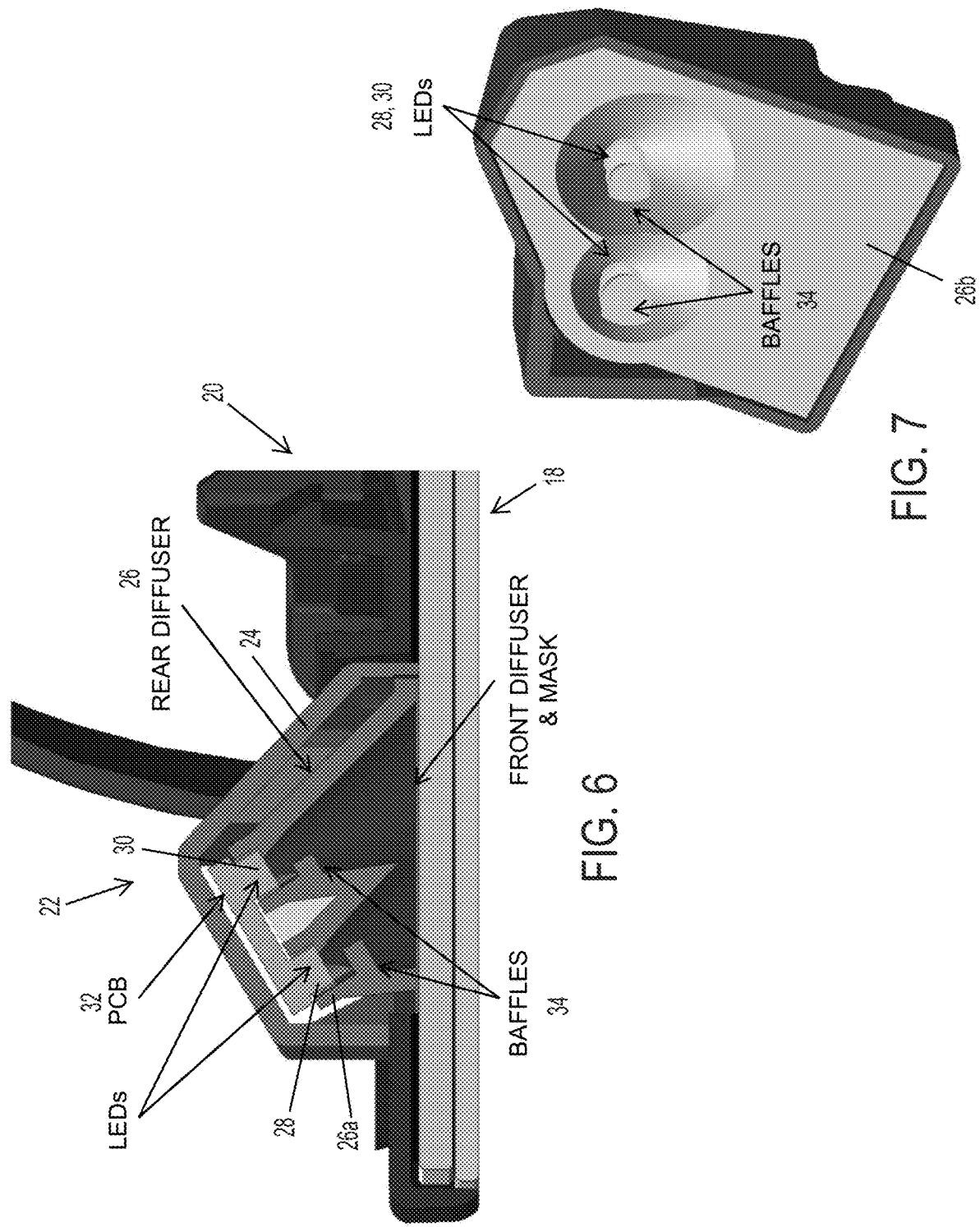

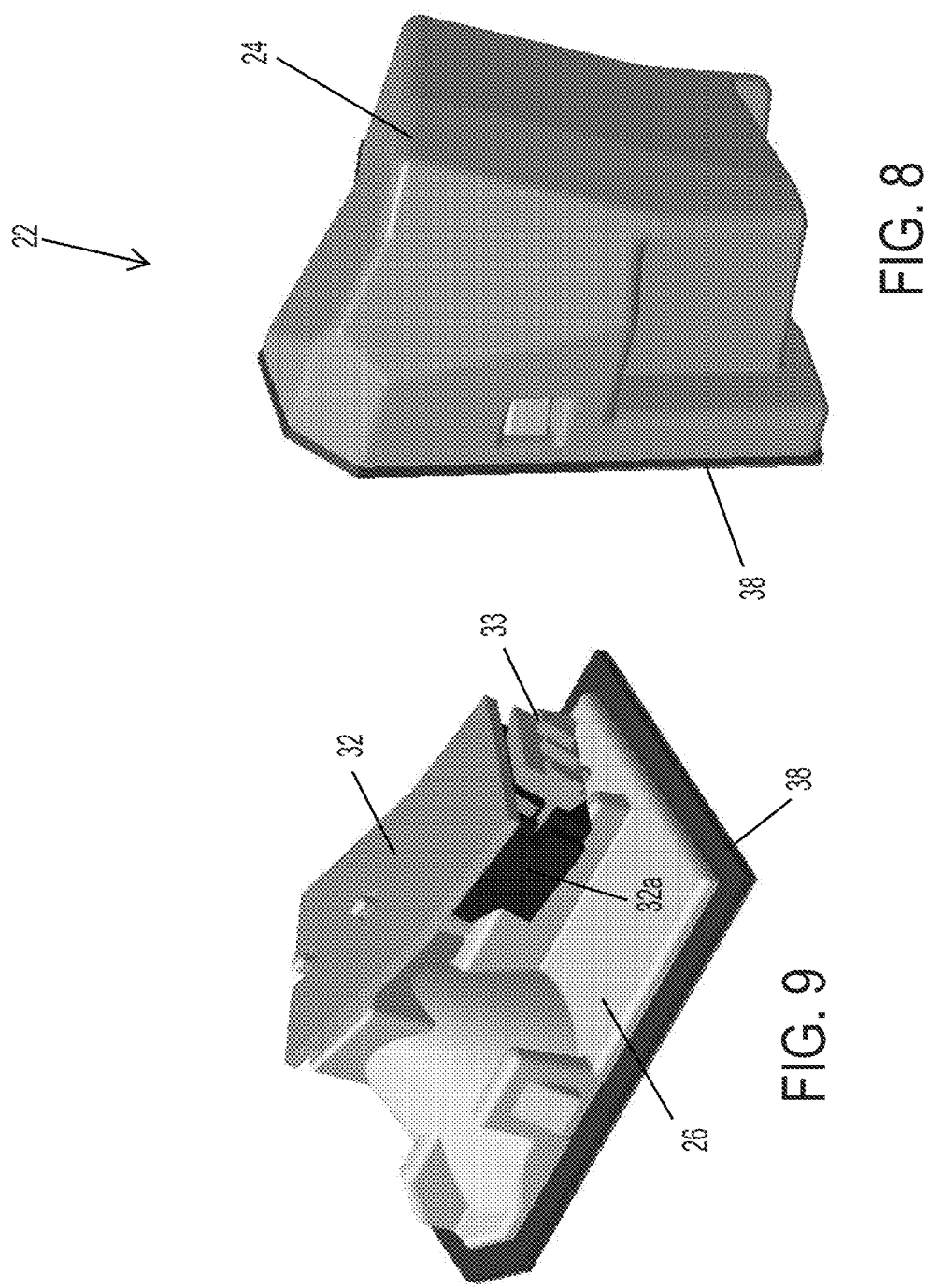

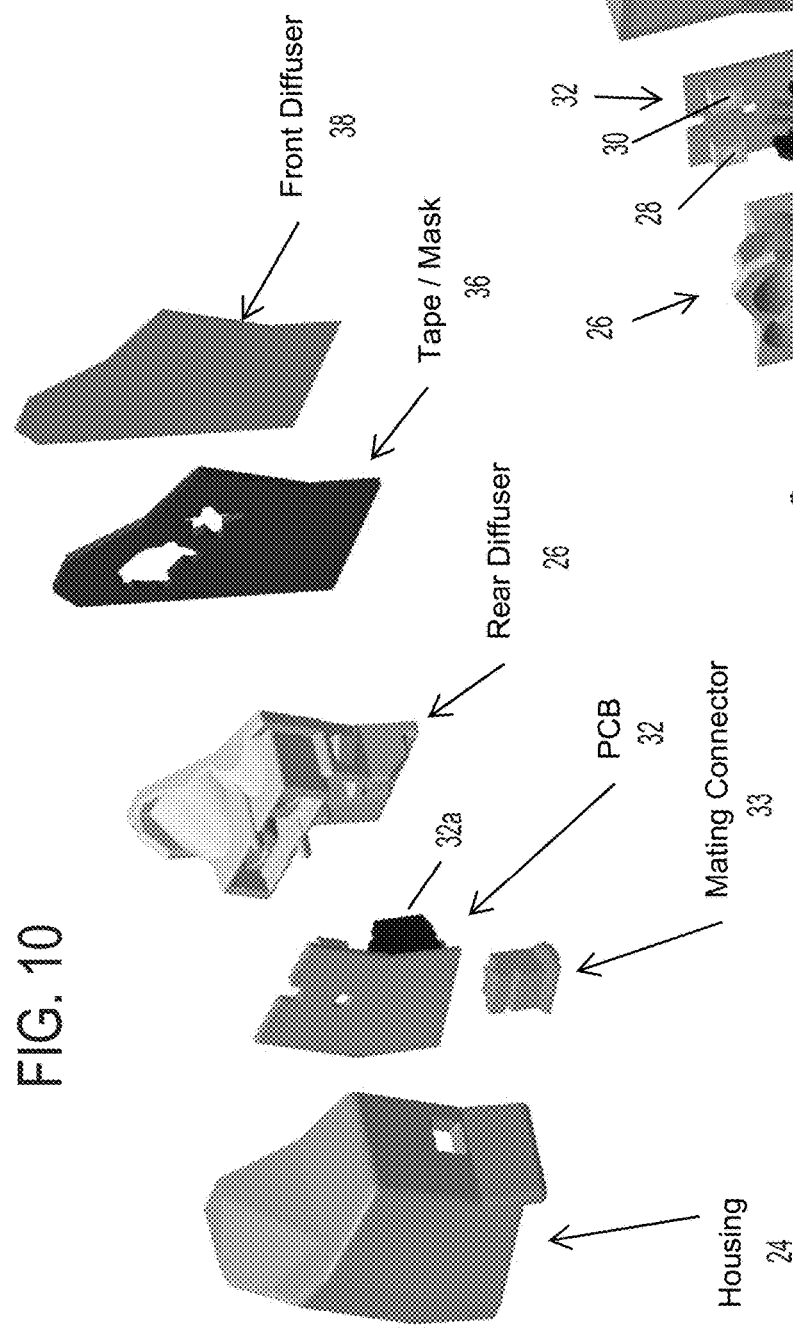
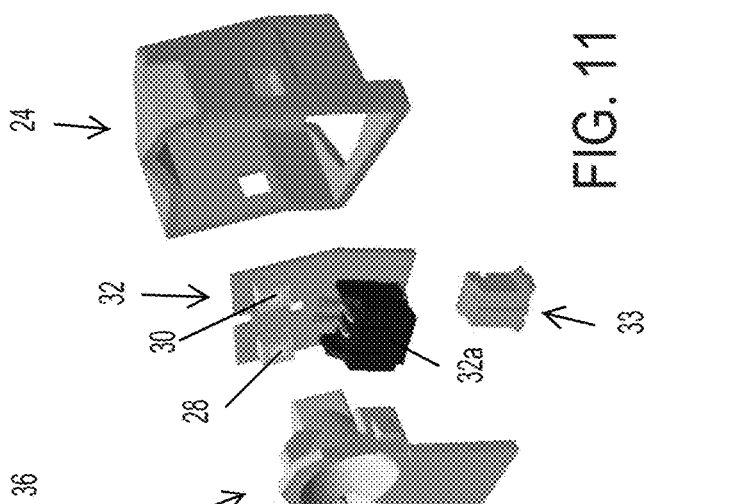
FIG. 10
FIG. 11

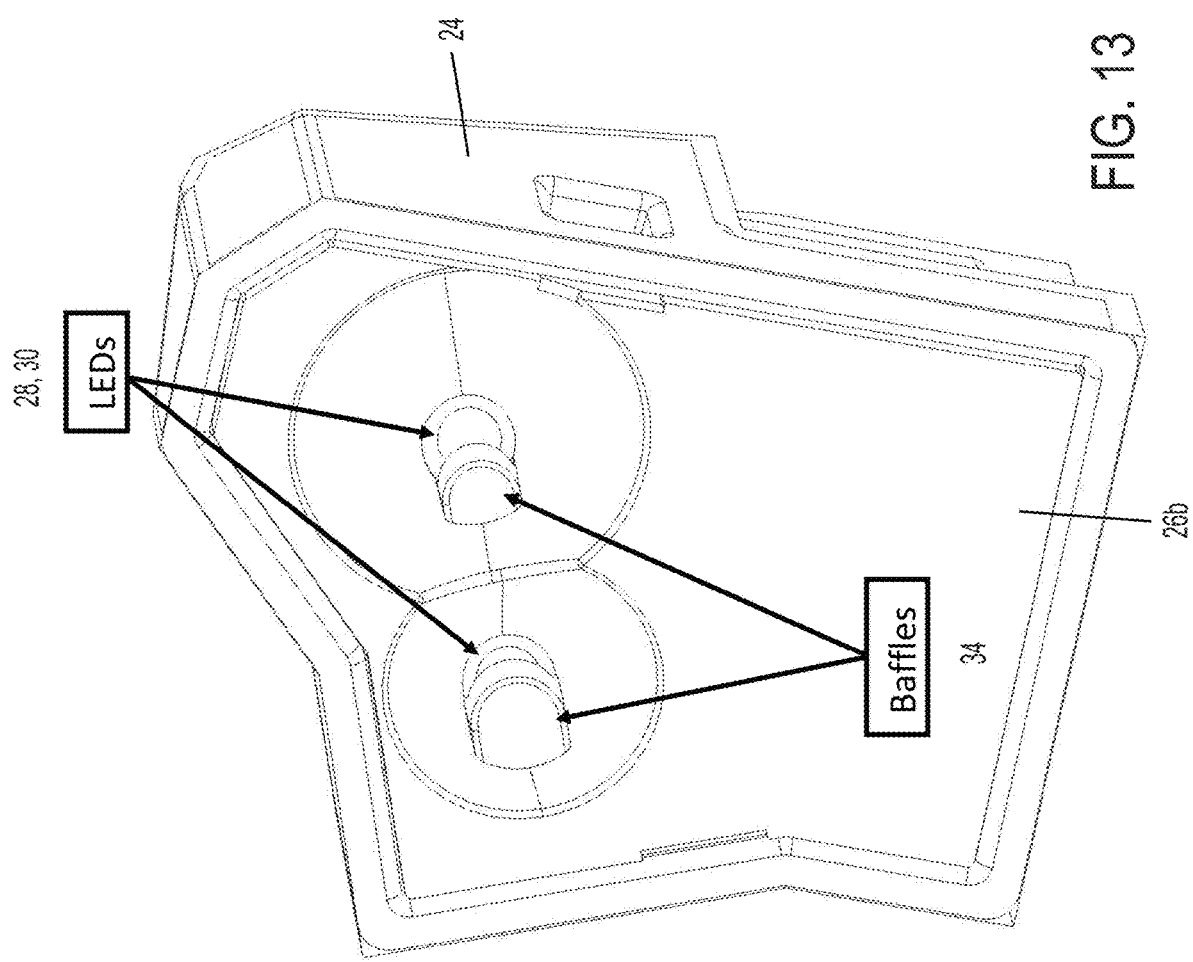

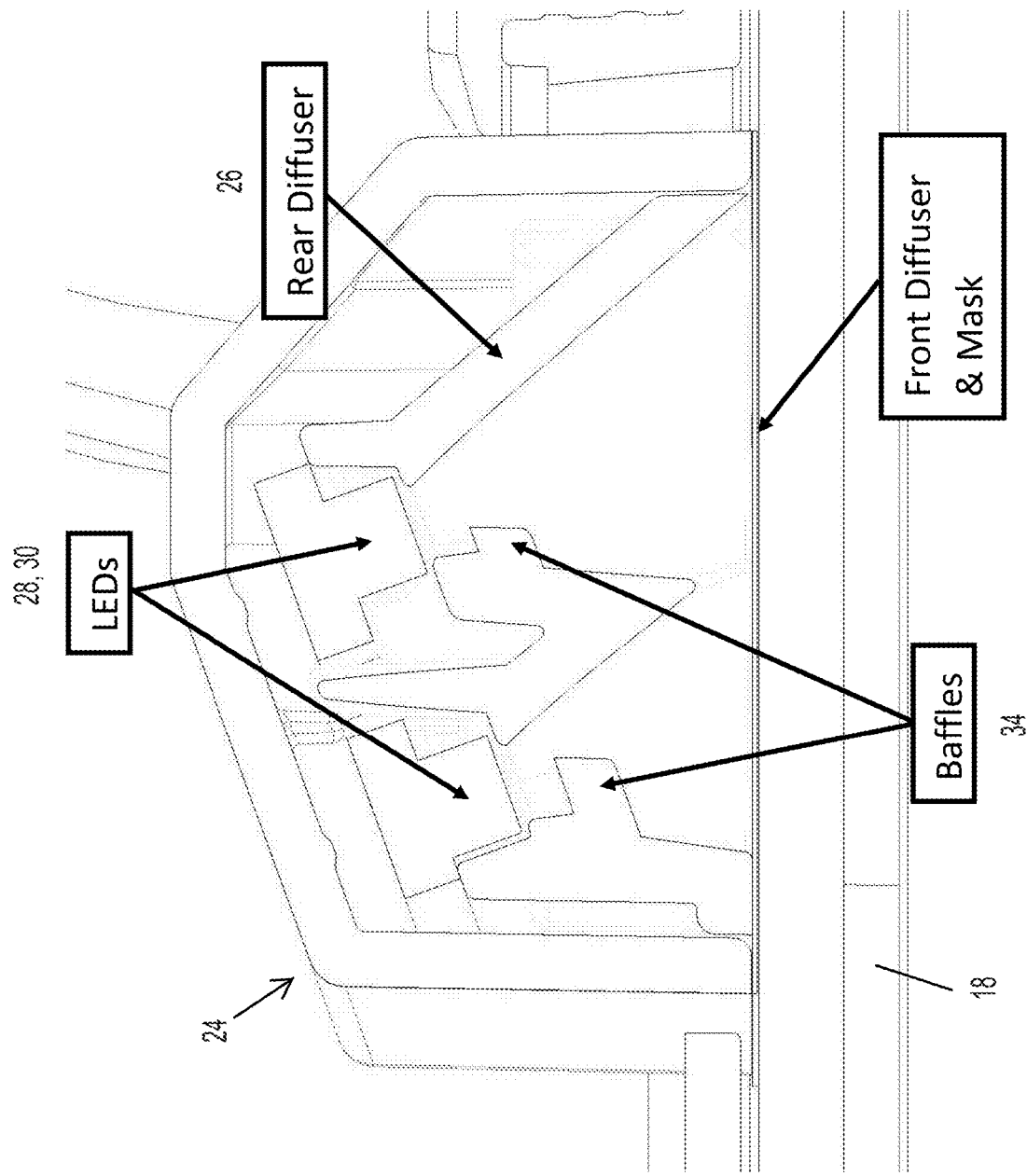

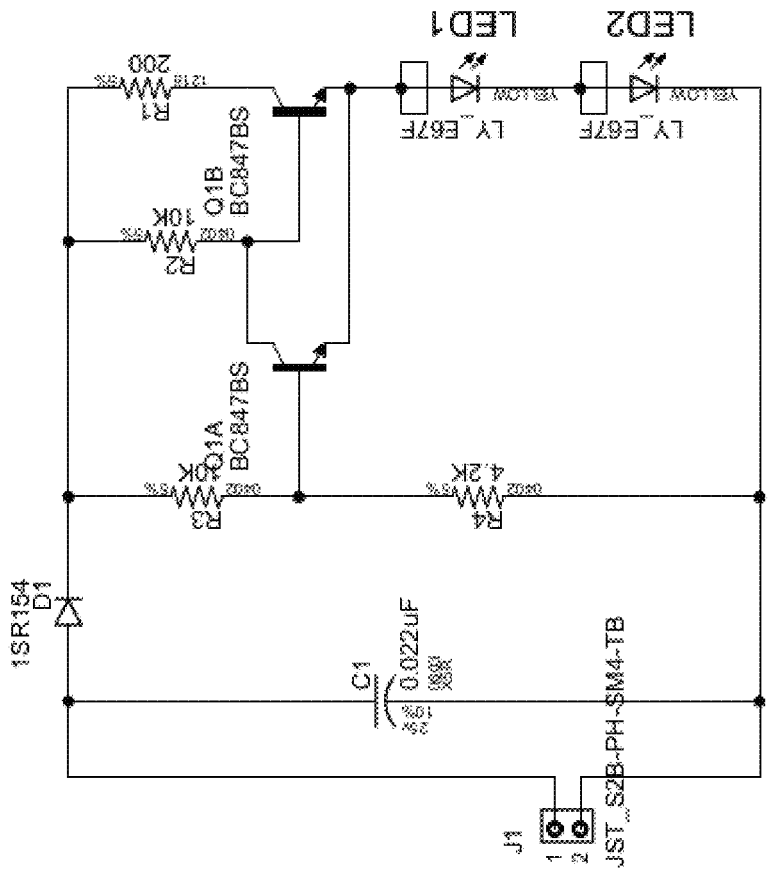
FIG. 16  With Overvoltage Protection
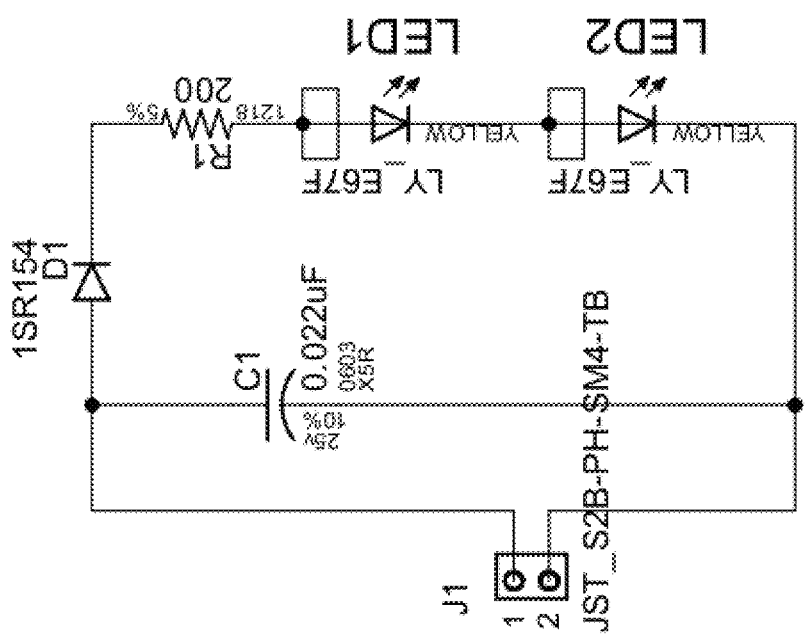
FIG. 15  Without Overvoltage Protection

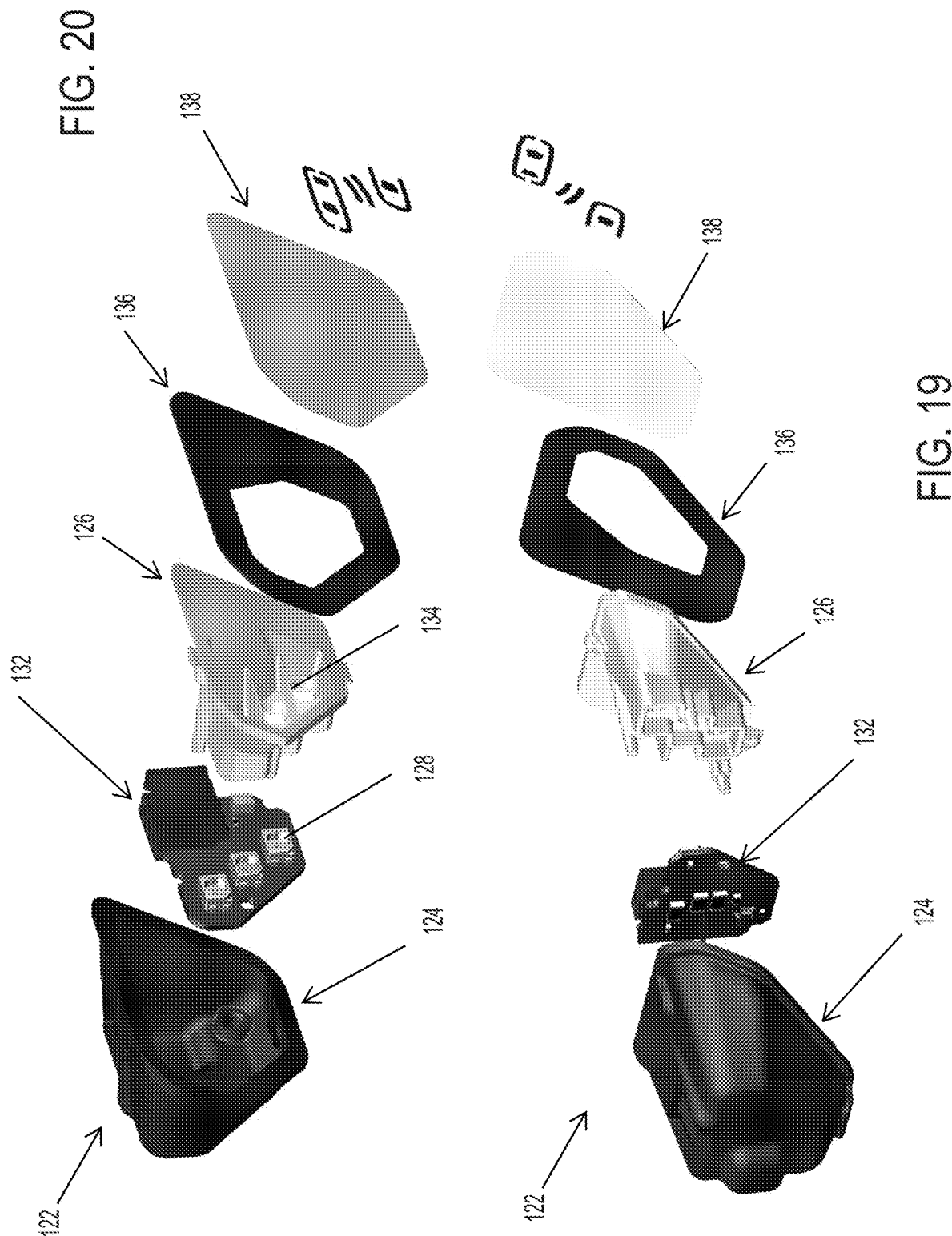

BZI icon

LCA icon

EXTERIOR MIRROR WITH BLIND ZONE INDICATOR

CROSS REFERENCE TO RELATED APPLICATIONS

The present application is a continuation of U.S. patent application Ser. No. 14/849,998, filed Sep. 10, 2015, now U.S. Pat. No. 9,761,144, which claims the filing benefits of U.S. provisional applications, Ser. No. 62/113,555, filed Feb. 9, 2015, and Ser. No. 62/049,077, filed Sep. 11, 2014, which are hereby incorporated herein by reference in their entireties.

FIELD OF THE INVENTION

The present invention relates to exterior rearview mirror assemblies and, more particularly, to an exterior rearview mirror assembly having a blind spot/object detection indicator and/or a lane change aid (LCA) indicator and/or a turn signal or other indicator at the exterior rearview mirror assembly.

BACKGROUND OF THE INVENTION

It is known to provide a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such a blind spot detection/LCA system often includes a visual indicator that visually indicates the detection of another vehicle or object to the driver of the host vehicle. It is also know to provide a turn signal indicator that is activated when a turn signal is activated by the driver of the equipped vehicle so as to provide an indication of the vehicle turning or changing lanes to the driver of a vehicle in an adjacent lane to the host or subject vehicle or to another person external to the host or subject vehicle. The visual indicator or indicators (commonly a light emitting diode or the like) of such systems is/are often located at the mirror reflective element of the exterior rearview mirror assembly.

A variety of interior and exterior mirror assemblies with indicators are known in the art, such as described in U.S. Pat. Nos. 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, and International Publication WO 95/30495, which are all hereby incorporated herein by reference in their entireties.

SUMMARY OF THE INVENTION

The present invention provides a blind zone or blind spot indicator or lane change assist (LCA) indicator or turn signal indicator or other indicator that is disposed at and may be integral with the mirror reflector carrier or back plate of the mirror reflector sub-assembly so as to be positioned at and attached to the mirror reflective element when the back plate is adhered or otherwise attached at the back of the mirror reflective element. Preferably, the signal indicator is provided as a sealed or substantially sealed unit or module that can be snapped into or otherwise attached or secured (preferably mechanically but optionally adhesively) at the mirror back plate (and does so substantially or wholly sealingly to limit or substantially preclude water ingress to the module so that the module and back plate are substantially water impervious), preferably at the mirror sub-assembly manufacturing operation when the mirror reflective element (and any associated heater pad or other item or element) is joined to the mirror back plate.

The blind zone indicator of the present invention includes a housing with a diffuser that is angled so that light emitted by one or more light sources (such as light emitting diodes) at the back or rear portion of the diffuser and housing is directed generally towards the side of the vehicle for viewing by the driver of the vehicle. The diffuser includes a baffle or light blocking or occluding element disposed in front of or at least partially in front of each of the light emitting diodes to limit or partially occlude direct illumination of a diffuser cover by the light sources and thus to limit bright spots when the indicator is activated and viewed. The present invention thus provides a mirror reflector carrier or back plate with an integrated blind spot or blind zone indicator (or a turn signal indicator and/or other indicator/indicators) that provides enhanced viewing of the illuminated icon of the indicator by the driver of the vehicle (or by others such as drivers of other vehicles approaching or overtaking or being overtaken by the equipped vehicle).

These and other objects, advantages, purposes and features of the present invention will become apparent upon review of the following specification in conjunction with the drawings.

BRIEF DESCRIPTION OF THE DRAWINGS

FIG. 2 is a plan view of a back plate for attaching at a mirror reflective element, with an indicator module disposed at the back plate in accordance with the present invention;

FIG. 3 is a plan view of the front side of the back plate and indicator module of FIG. 2;

FIG. 4 is a side view of the back plate and indicator module of FIG. 2;

FIG. 5 is an enlarged perspective view of a portion of the back plate and indicator module of FIG. 2;

FIG. 6 is a sectional view of the back plate and indicator module of the present invention;

FIG. 7 is a perspective view of the indicator module of the present invention;

FIG. 8 is another perspective view of the indicator module of the present invention;

FIG. 9 is a perspective view of the indicator module of the present invention, shown without the module housing to show additional details;

FIGS. 10 and 11 are exploded perspective views of the indicator module of the present invention;

FIG. 13 is a perspective view of the indicator module of the present invention, shown with the icon mask removed;

FIG. 14 is another sectional view of the indicator module of the present invention;

FIG. 15 is an electrical schematic of a circuit for controlling the light emitting diodes of the indicator module of the present invention, without overvoltage protection;

FIG. 16 is an electrical schematic of another circuit for controlling the light emitting diodes of the indicator module of the present invention, with overvoltage protection;

FIGS. 19 and 20 are exploded perspective views of the indicator module of the present invention;

DESCRIPTION OF THE PREFERRED EMBODIMENTS

Figure 1:
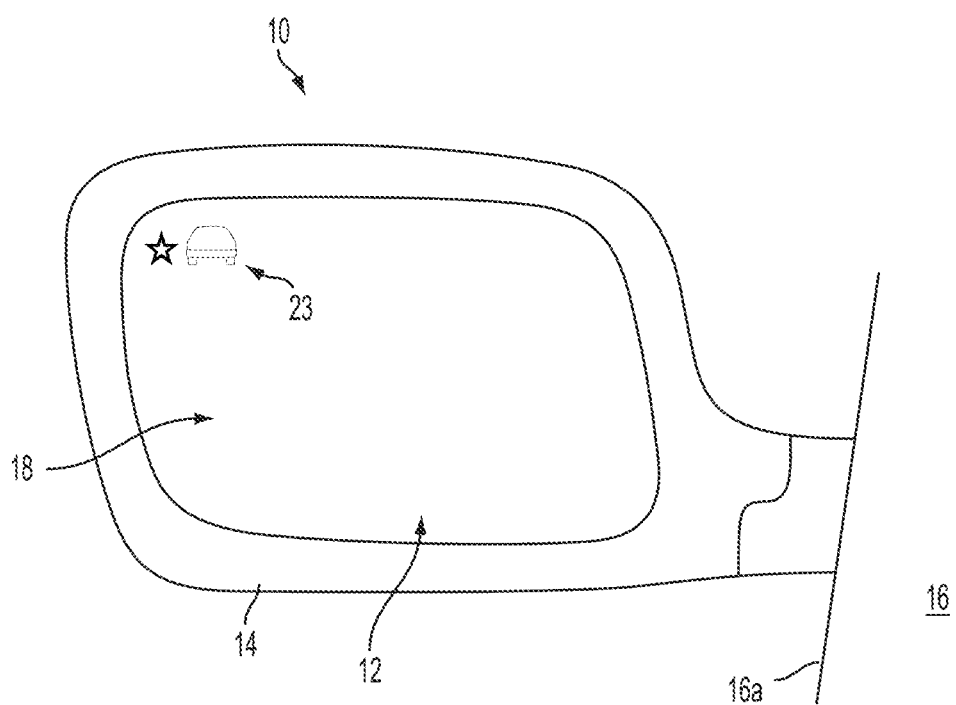
FIG. 1 is a view of an exterior mirror assembly with a blind zone indicator or indicator module in accordance with the present invention, shown as viewed in the direction of travel of the vehicle.

Referring now to the drawings and the illustrative embodiments depicted therein, an exterior rearview mirror assembly 10 for a vehicle includes a mirror reflector sub-assembly 12 and a mirror shell or casing 14 (FIG. 1). Mirror assembly 10 is mounted at the side 16a of a host or subject vehicle 16. The mirror reflector sub-assembly 12 includes a mirror reflective element 18 and a mirror reflector carrier or back plate 20 (FIGS. 2-5) attached to or mounted to or adhered to a rear surface of the mirror reflective element 18. Mirror assembly 10 includes an indicator or display element or device or signal indication module 22 that is disposed at back plate 20 and behind reflective element 18, and that is operable to provide a display or indication 23 at the reflective element for viewing the display or indication through the mirror reflective element.

Signal indication module 22 includes a housing 24 (that is received into or attached to an indicator receiving portion or mounting portion or structure of back plate 20 so as to be disposed generally at a rear surface of a planar portion of back plate 20) and an illumination source or indicator, such as one or more light emitting diodes (LEDs) or other suitable illumination source. In the illustrated embodiment, the light source comprises a pair of light emitting diodes 28, 30, with each light emitting diode being independently energized or powered for illuminating a respective icon established at a mask 36 disposed at a front diffuser 38 of the indicator module. Signal indication module 22 includes a diffuser element 26 that is formed to angle the light emitting diodes 28, 30 such that light emitted by the light emitting diodes, when activated or energized or powered, is principally viewed by the driver of the vehicle. The diffuser element 26 includes a baffle 34 disposed directly in front of or partially in front of the respective light emitting diode, and partially but not fully occluding light emitted by the light source or light emitting diode, to limit or reduce bright spots of the light emitted by the light emitting diode at the front diffuser to reduce bright spots or hot spots that may otherwise be viewed by the driver of the vehicle, as discussed below.

In the illustrated embodiment, the signal indication module 22 comprises a blind zone indicator for an object detection in a blind spot detection system or LCA system (with the indicator module being angled and operated to provide a signal that is principally viewable by the driver of the vehicle). Optionally, the indicator module may also or otherwise include a display device or indicator for a turn signal indicator or signal indication module or other indicator device. The blind zone or signal indicator assembly or indicator module of the present invention may utilize aspects of the indicators described in U.S. Pat. Nos. 8,786,704; 8,058,977; 7,944,371; 7,581,859; 7,038,577; 6,882,287; 6,198,409; 5,929,786 and/or 5,786,772, and/or International Publication Nos. WO 2007/005942 and/or WO 2006/124682, which are all hereby incorporated herein by reference in their entireties.

As shown in FIGS. 3 and 4, signal indication module 22 includes a circuit element 32, such as a printed circuit board or the like (such as a rigid or flexible circuit board or element), with a pair of illumination sources or LEDs 28, 30 disposed thereat (such as surface mounted or otherwise disposed LEDs or other suitable or equivalent light source), although more illumination sources or LEDs may be provided while remaining within the spirit and scope of the present invention. Circuit element 32 is attachable at or positioned at a rear portion 26a of the diffuser element 26 and disposed in housing 24 (such as received at a pocket or receiving portion formed at the rear portion of the diffuser element 26), whereby the illumination sources 28, 30 are located at the rear portion of the housing and at an opposite end of the housing from the reflective element 18.

In the illustrated embodiment, the diffuser element 26 (with circuit element or PCB attached thereat) is received in and attached at (such as via a snap attachment) housing 24 to substantially encase the circuit element 32 within the module. Optionally, diffuser element 26 may snap and/or or may be sealed or adhered or welded to the housing 24 to substantially seal circuit element 32 within the housing of the signal indication module. As can be seen in FIGS. 9-11, circuit element 32 includes electrical terminals or connectors 32a that are in electrical or conductive communication with illumination sources 28, 30 and that electrically connect the circuitry and light sources to electrical power or electrical control at the mirror assembly when the signal indication module is attached to the back plate and installed at the mirror casing. Optionally, connectors 32a connect to a mating connector 33, which is disposed at an opening in housing 24 for electrical connection to a connector of the mirror assembly or vehicle to provide power and/or control to the signal indication module when the module is mounted to or attached to the back plate and installed at the mirror casing.

Signal indication module 22 includes an icon element or indicia element or masking element 36 that is disposed at a forward end region or portion 26b of diffuser element 26 so as to be disposed at the rear of the reflective element when the signal indication module 22 is attached to the back plate 20. The indicia element is formed to provide the desired or appropriate icon or icons for viewing by the driver of the vehicle (for a blind spot detection system application) when the icon or icons of the indicia element is/are backlit or illuminated by the respective illumination source 28, 30. Optionally, the walls or surfaces of diffuser element may comprise highly specularly and/or diffusely light reflecting inner surfaces so as to enhance diffuse reflection of incident light to enhance the intensity of illumination that exits the indicator module through the indicia element. For example, the diffuser wall may be molded of a white plastic material or resin, such as an ABS or an ABS/polycarbonate polymeric resin material or the like.

Optionally, and desirably, a diffuser cover or film or element 38 may be disposed at the front (or rear) of the indicia element 36 to diffuse the light emitted by the illumination sources 28, 30 to provide more uniform illumination of the indicia element 36 (when the illumination sources are activated) as viewed by the driver of the vehicle. The diffuser element 38 and indicia element 36 may be attached or adhered at the front end portion or surface of the diffuser element 26 (and the diffuser element may also or otherwise be adhered to the rear of the reflective element when the indicator module is attached at the back plate). Optionally, the mirror reflective element may comprise a transflective mirror reflective element having a mirror reflector that is partially transmissive of light so that the illuminated icons are viewable through the reflective element by the driver of the vehicle. Optionally, and as shown in FIG. 12, the mirror reflective element 18' may comprise a mirror glass substrate having a reflector coating at its outer or front surface, with icons 18a' formed (via masking or ablation) through the reflector coating so that the illuminated icons of the signal module are viewable through the ablated windows of the reflective element by the driver of the vehicle.

To limit or reduce or avoid hot spots (areas of excessive brightness), on the parts of the front diffuser that are closer to the light sources (LEDs), the baffles 34 are incorporated in the diffuser element 26 and at or in front of the light sources 28, 30 so as to cast a diffuse shadow from the light radiating directly from the respective light source 28, 30. This serves to balance the amount of light projected onto the various areas of the mask 36 and front diffuser 38. Areas of the front diffuser that are further away from the light source(s) receive more direct radiation from the light source(s), while areas of the front diffuser that are closer to the light source(s) receive less direct radiation from the light source(s), such that the indicator module provides more uniform lighting of the icon or icons and thus provides enhanced viewing of the indicator icons by the driver of the vehicle.

Figure 12:
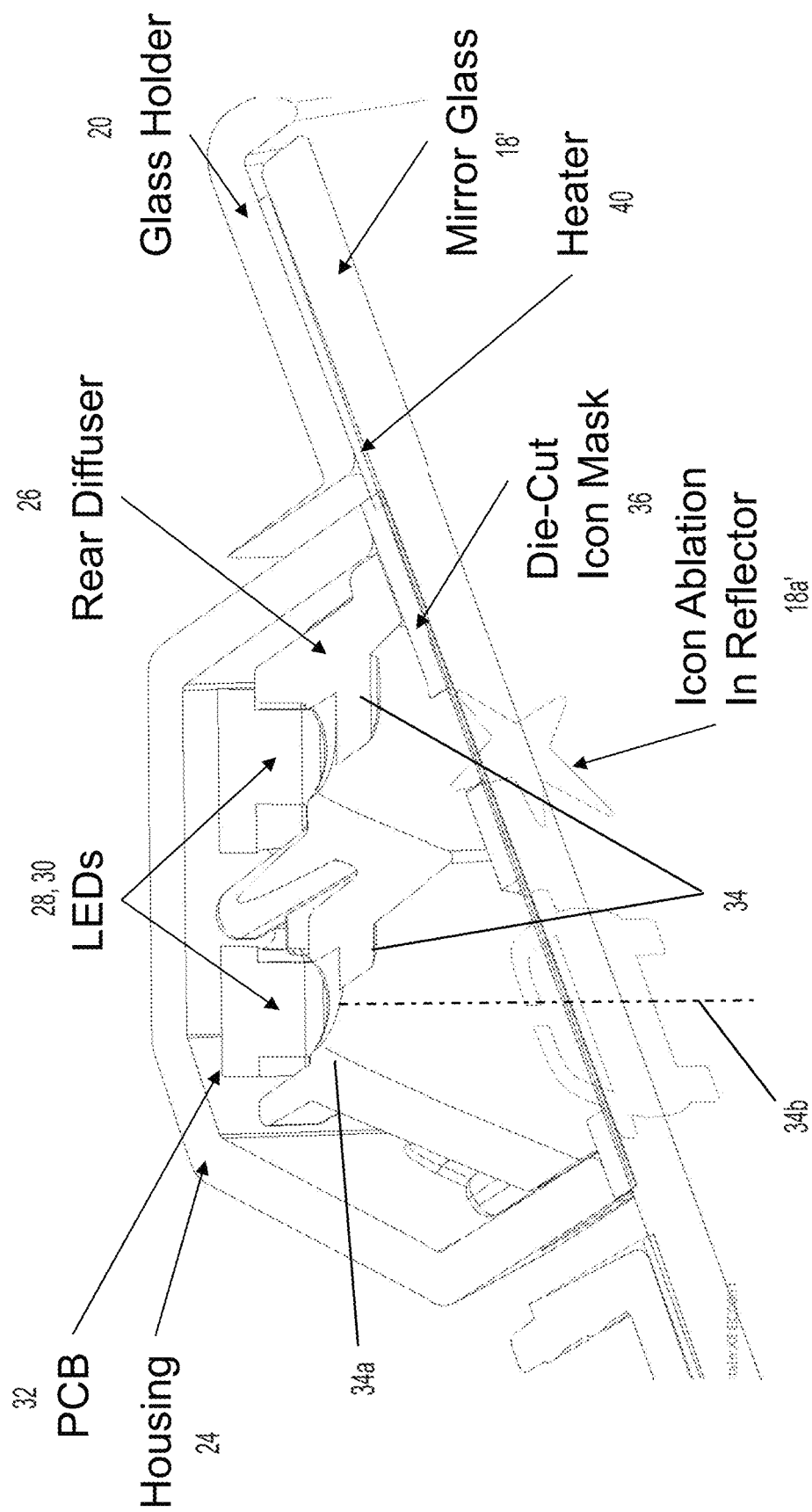
FIG. 12 is a sectional view of the indicator module of the present invention.
Figure 18:
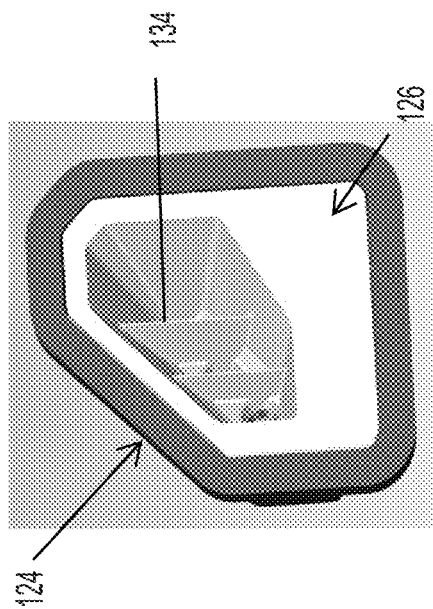
FIG. 18 is a perspective view of the diffuser of the indicator module of FIG. 17.
Figure 17:
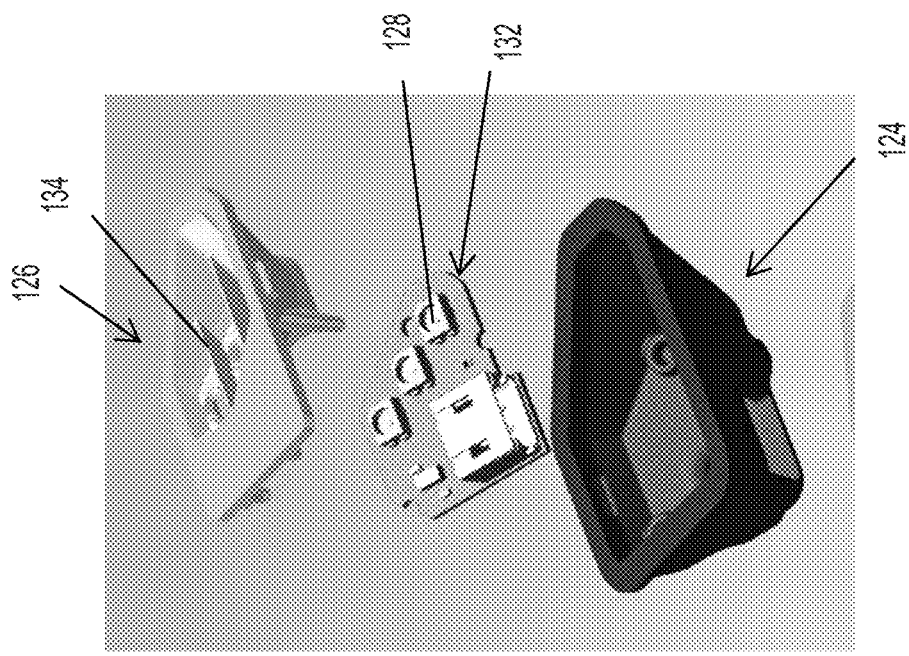
FIG. 17 is an exploded perspective view of another indicator module of the present invention, with louvers disposed between apertures of the light sources of the module.
Figure 22:
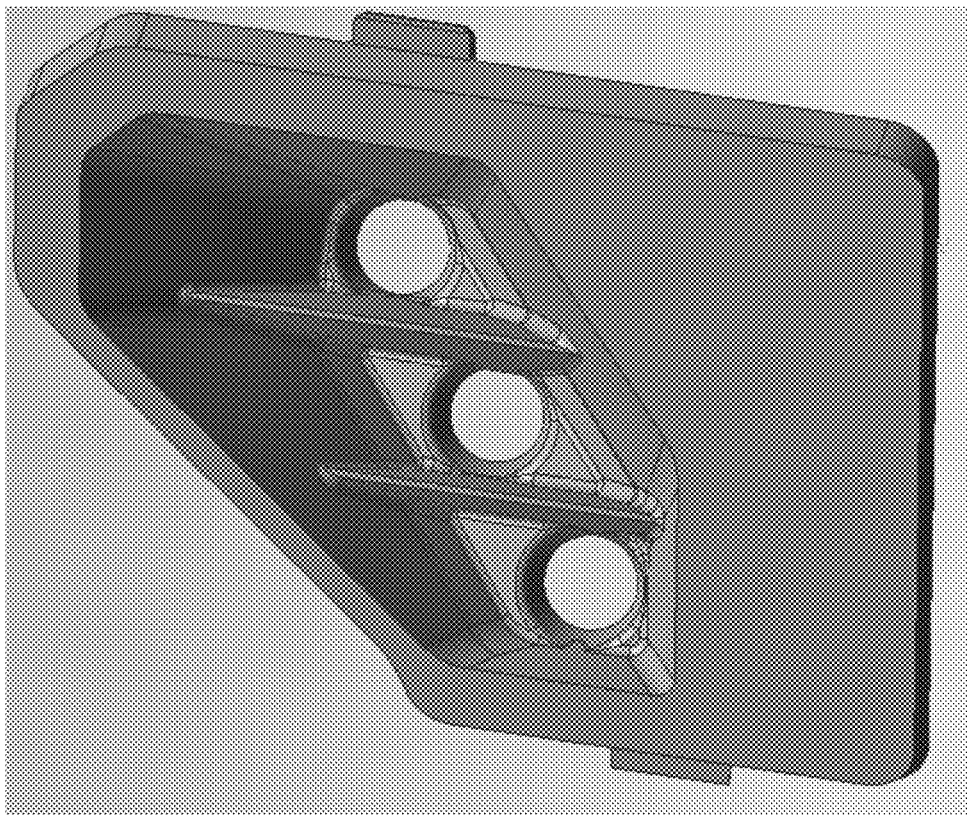
FIGS. 21 and 22 are perspective views of module covers with louvers in accordance with the present invention.
Figure 21:
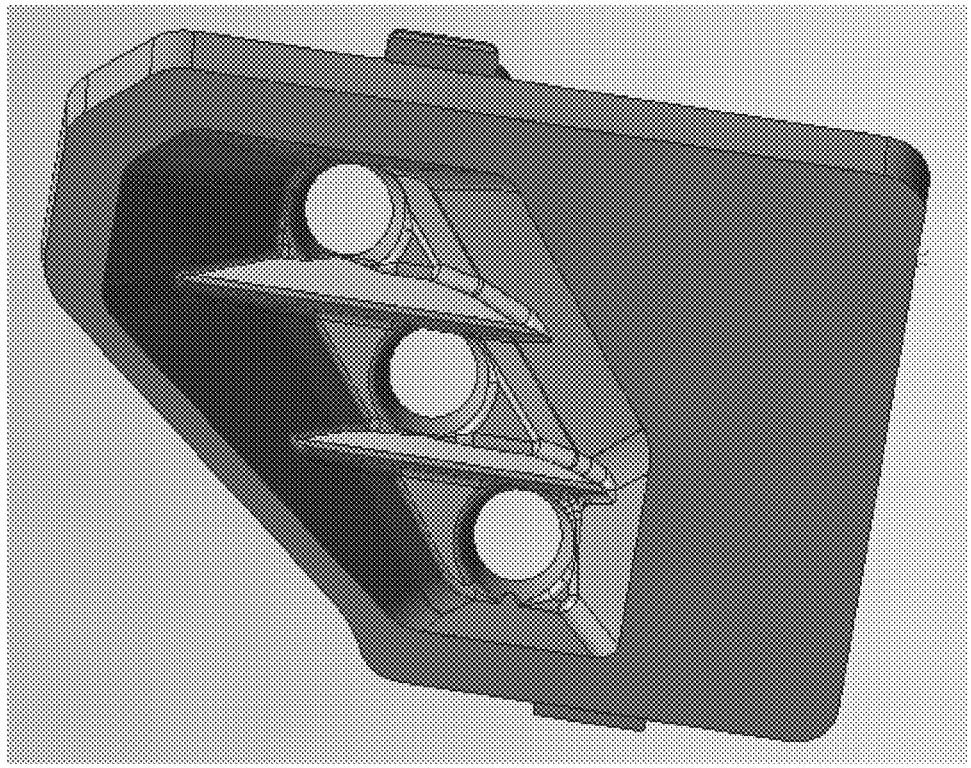
Figure 24:
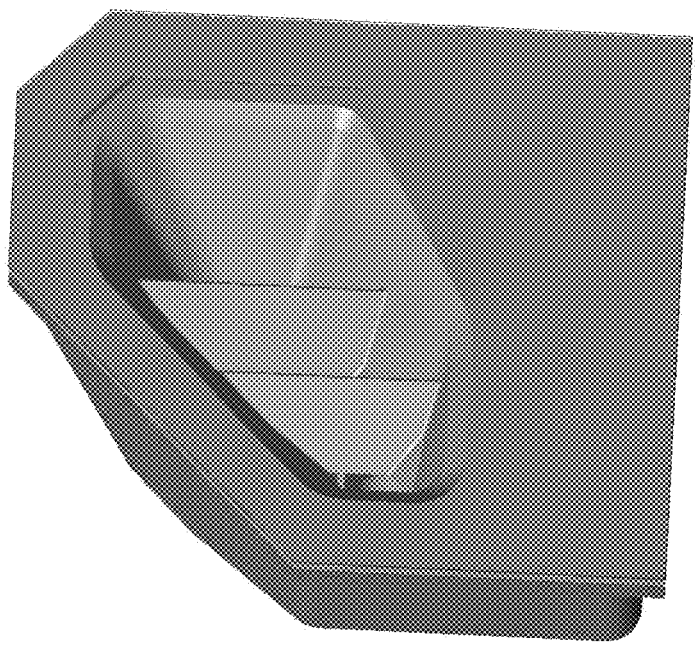
FIGS. 23 and 24 are perspective views of indicator modules with louvers in accordance with the present invention.
Figure 23:
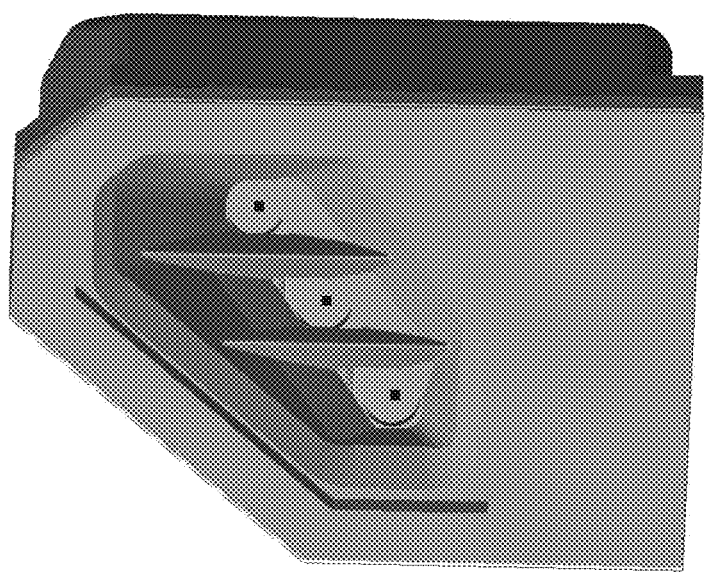

In the illustrated embodiment, and such as can be understood with reference to FIGS. 12 and 13, the baffles are formed as part of the rear diffuser 26 (such as during the molding of the plastic diffuser body) and protrude from the angled wall of the diffuser so as to be disposed at least partially in front of the respective LED to block or limit direct light emitted by the LED, so that the light emitted by the light source or light emitting diode is partially but not fully occluded by the baffle 34. In the illustrated embodiment (and such as can be seen with reference to FIG. 12), the LEDs are disposed at an end region or apex region 34a of the conical-shaped walls of the diffuser element and the baffles are formed at and protrude from a side or wall portion (of the conical formed wall or walls) of the diffuser element that is outboard of the respective LED, and the baffles protrude or extend inward towards an axis 34b of the conical-shaped walls, such that the baffle is disposed at least partially in front of the respective LED and blocks or substantially limits light emitted by the LED in the outboard direction to reduce viewability of the emitted light by drivers of other vehicles in the side lane adjacent to the equipped vehicle. The baffles are oriented to be in a plane that is generally normal to the LED and circuit element so as to be disposed in the path of light emitted by the LED.

The baffles thus extend from the outboard portions of the diffuser (outboard of the respective LED) to limit or block light emitted by the respective LED from being emitted outboard towards drivers of other vehicles. The baffles do not protrude fully over or in front of the respective LED so that light emitted by the respective LED is readily viewable by the driver of the equipped vehicle. Although shown and described as being formed or molded with the diffuser element (and with the angled surfaces or conical surfaces or walls of the element), it is envisioned that the baffles may be separately formed and attached or clipped at the diffuser element so as to be positioned and oriented in front of or partially in front of the respective LED in the selected manner.

The baffles may comprise generally disc-shaped or circular-shaped elements or baffles and may be sized to provide the desired degree of blocking of light emitted by the respective LEDs. The size of the baffles or degree in which the baffles protrude in front of the respective LEDs may vary depending on the particular application of the module. Optionally, for a turn signal indicator module application, the baffles may be formed at and protrude from a side or wall portion (of the conical formed wall or walls) of the diffuser that is inboard of the respective LED, such that the baffle blocks or substantially limits light emitted by the respective LED in the inboard direction to reduce viewability of the emitted light by the driver of the equipped vehicle.

Illumination sources 28, 30 are independently or individually operable or activatable or energizable to provide illumination at and through or along the diffuser element 26, whereby the illumination is transmitted through the mask or indicia element 36 and front diffuser 38 and through the aperture in back plate 20 and through the reflective element so as to be viewable through the mirror reflective element by a person viewing the mirror assembly 10. The signal indication module 22 may comprise a blind spot or object detection indicating device or module that is operable to indicate to the driver of the subject or host vehicle that an object or other vehicle is detected at the side or blind spot region of the host vehicle by a blind spot detection system. Optionally, aspects of the blind zone indicator module of the present invention may be used for a turn signal indicating device or module that is operable to indicate to the driver or passenger of another vehicle that the equipped vehicle is turning or changing lanes, or other forms or types of display or illumination or indicating devices or modules, while remaining within the spirit and scope of the present invention. In such an application, the baffles preferably would be disposed at and protrude from an inboard side wall or portion of the diffuser element inboard of the respective LED.

Illumination sources 28, 30 are energized to direct or emit illumination along the diffuser element so that the indicator/light is viewable through the reflective element, while the baffles 34 limit direct viewing of the light emitting diodes so that bright spots are limited or reduced. The illumination sources 28, 30 may comprise any suitable illumination source or light source. For example, the illumination sources may comprise one or more light emitting diodes (LEDs) or organic light emitting diodes (OLEDs) or the like, or may comprise one or more power LEDs, such as of the types described in U.S. Pat. No. 7,195,381, which is hereby incorporated herein by reference in its entirety, or may comprise a LUXEON® LED available from LUMILEDS™ or other suitable light source.

The illumination sources 28, 30 may be controlled or operated via any suitable circuitry and/or control. For example, a circuit may be operable to power the LEDs without overvoltage protection (such as shown in FIG. 15) or a circuit may be operable to power the LEDs with overvoltage protection (such as shown in FIG. 16). When powered, the LEDs may provide up to about 11,000 nits minimum average brightness at nominal supply voltage (such as between about 9 and 16 volts DC, such as about 13.5 Volts DC), with a generally uniform illumination. The LEDs may emit colored light or white light, depending on the particular application, and may operate at a maximum current of about 100 mA and may be operable at temperatures between about −30 degrees C. and +65 degrees C.

Optionally, a light directing or light turning film or element may be disposed at the rear of the glass substrate. Such a light directing film may direct or angle the light emitted by the illumination sources in the desired direction (such as towards the driver of the vehicle). Optionally, such a light directing film may be part of the diffuser element (close to the rear surface of the mirror reflective element). The light directing film may allow the module depth to be reduced and/or may allow the circuit board and light sources or LEDs to be configured to be closer to parallel (less angled) to the rear surface of the mirror reflective element. The light directing film may comprise any suitable light directing film that may direct or bend or angle light passing through the film, such as, for example, a direction turning film (DTF) of the types commercially available from Luminit, LLC of Torrance, Calif., or the like.

Optionally, a heater pad 40 (FIG. 12) may be provided at the rear surface of the glass substrate of the reflective element and between the backing portion of the back plate and the reflective element to provide an anti-fogging or de-fogging feature to the exterior mirror assembly (such as by utilizing aspects of the heater elements or pads described in U.S. Pat. No. 7,400,435, which is hereby incorporated herein by reference in its entirety). The back plate and/or heater pad may include suitable electrical connectors and connections incorporated therein (such as by utilizing aspects of the mirror assembly described in U.S. Pat. No. 7,400,435) for electrically connecting the heater pad and/or indicator module and/or display element (or other suitable electrical connectors may be utilized, such as electrical leads or wire harnesses or pigtails or other separate connectors or cables or the like). The heater pad may include a hole or opening or aperture therethrough (or optionally a window or transparent or translucent or diffuse portion of the heater pad, such as a clear or diffusing transparent polyester flexible plastic film or element) that generally corresponds to the aperture of the back plate when the heater pad is attached to the rear surface of the glass substrate of the reflective element and when the back plate is attached to the rear surface of the heater pad. Optionally, and desirably, the heater pad may include an adhesive layer (such as a pressure sensitive adhesive layer) at its rear surface for adhering the back plate to the heater pad and thus to the rear surface of the glass substrate of the reflective element.

Optionally, and with reference to FIGS. 17-20, a signal indication module 122 includes louvers 134 disposed at and between the light sources to provide the desired directionality of light emitted by the module. Signal indication module 122 includes a housing 124 (that is received into or attached to an indicator receiving portion or mounting portion or structure of the mirror back plate so as to be disposed generally at a rear surface of a planar portion of the back plate) and an illumination source or indicator, such as one or more light emitting diodes (LEDs) 128 or other suitable illumination source. In the illustrated embodiment, the light source comprises three light emitting diodes 128, with each light emitting diode optionally being independently energized or powered for illuminating one or more icons (such as a respective icon associated with an individual LED) established at a mask 136 disposed at a front diffuser 138 of the indicator module (the mask may be a separate element with the icon or indicia is formed therethrough, or may comprise an icon or indicia established at or through or partially through the mirror reflector of the reflective element). Signal indication module 122 includes a diffuser element 126 that is formed to angle the light emitted by the light emitting diodes 128 such that light emitted by the light emitting diodes, when activated or energized or powered, is principally viewed by the driver of the vehicle. The indicator module 122 may be similar to indicator module 22, discussed above (and optionally an indicator module of the present invention may include both louvers and baffles), such that a detailed discussion of the indicator modules need not be repeated herein.

The diffuser element 126 includes louvers 134 disposed between and in front of pairs of adjacent or respective light emitting diodes to direct or guide or angle the light emitted by the light emitting diodes at the front diffuser to provide enhanced directionality of the emitted light. The louvers 134 are disposed or formed or established at the diffuser element 126 (which may have polished surfaces at and around the ports or apertures that are aligned with the LEDs 128 to enhance the illumination) and angled at a desired amount to provide the desired or appropriate directionality of the light emitted by the LEDs. In the illustrated embodiment, the indicator module comprises a pair of louvers 134 that are generally parallel to one another and that may be generally parallel to the respective walls of the diffuser element. The surfaces of the louvers are angled relative to the plane of the front surface of the diffuser element to provide the desired or selected directing or guiding of light emitted by the LEDs. Thus, the emitted light may be directed so as to be viewable by the driver of the subject vehicle and not substantially viewable by driver(s) of other vehicles (for a blind zone indicator application, where the louvers may help to achieve OEM angle requirements for such blind zone indicators) or the emitted light may be viewable by a driver of another vehicle overtaking the subject vehicle in an adjacent side lane (for a turn signal indicator application) while not being substantially viewable by the driver of the subject vehicle, depending on the particular application of the indicator module.

Figure 26:
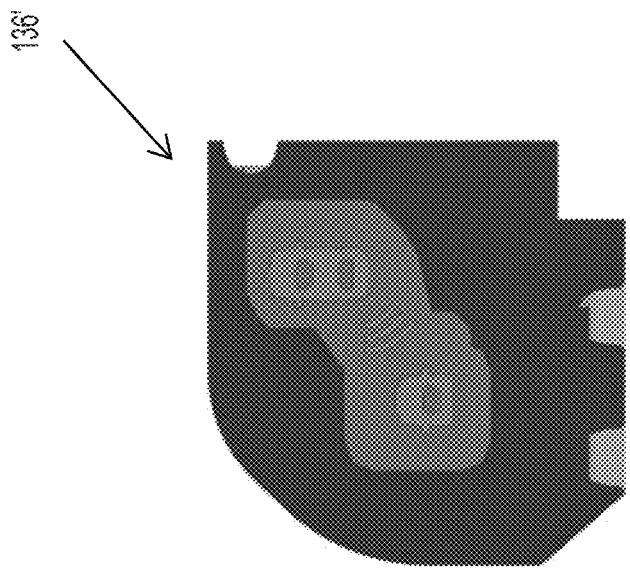
FIGS. 25 and 26 are plan views of masks of the indicator module, showing an LCA icon (FIG. 25) and a BZI icon (FIG. 26)
Figure 25:
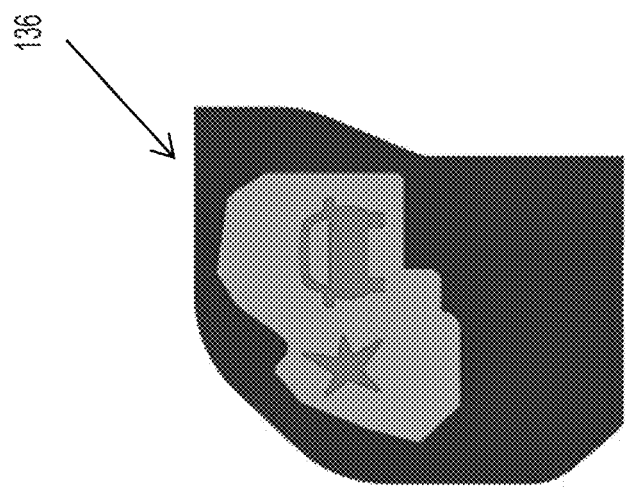
Figure 27:
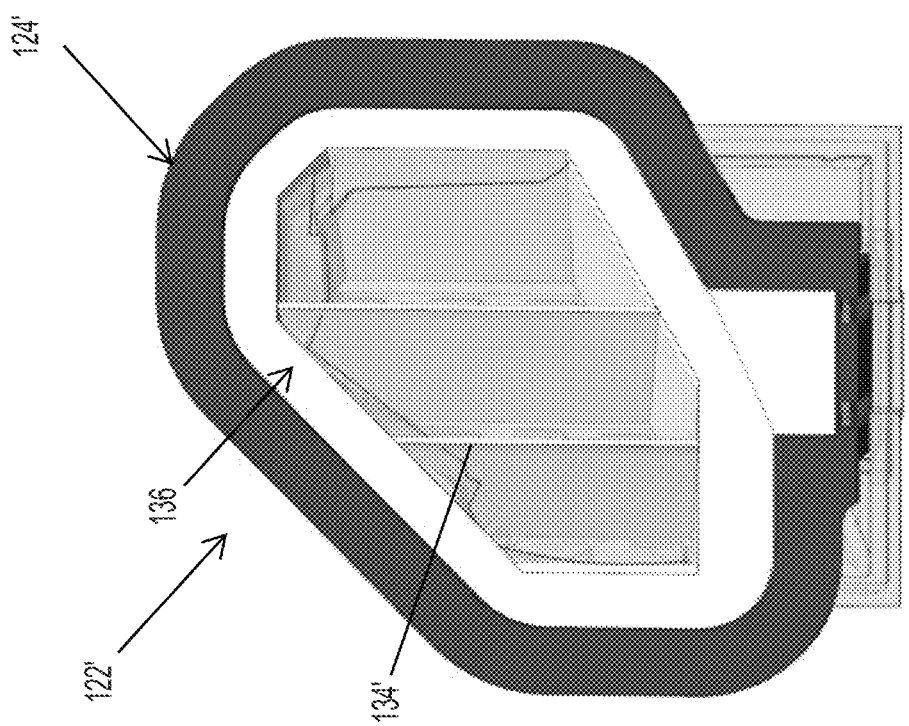
FIG. 27 is a plan view of another indicator module of the present invention.

As shown in FIGS. 21-24, the louvers are angled relative to the diffuser element front surface to provide the desired inboard or outboard directing of light emitted by the LEDs that are disposed behind and aligned with the ports or apertures formed through the diffuser element. The masking element (not shown in FIGS. 21-24) is disposed at the front surface of the diffuser element to provide the desired icons or indicia at the mirror reflective element when the illumination module is activated. For example, a lane change assist (LCA) icon (FIG. 25) may be provided at the mask or masking element 136 or a blind zone indicator (BZI) icon (FIG. 26) may be provided at the mask or masking element 136', depending on the particular application of the indicator module. Thus, when the LEDs 128 are activated, the desired or selected icons or indicia are viewable at the mirror reflective element by the driver of the vehicle (or by drivers of other vehicles for a turn signal indicator application). The indicator module may have any desired shape depending on the particular application. For example, a reduced size indicator module 122' (FIG. 27) may be provided where the diffuser element 126' (with louvers 134') and housing 124' are generally formed to correspond to the circuit board shape and LED arrangement.

The louvers assist in achieving the OEM angle requirements for a Blind Zone Indicator. Optionally, it is envisioned that such a louver concept may be used for other directional light requirements at the mirror assembly, such as turn signal indicators or the like. Optionally, the diffuser may include louvers in between the light emitting diodes to direct illumination or block from the light sources or LEDs and thus to meet angle specifications when the indicator is activated and viewed by a person viewing the mirror assembly.

Figure 28:
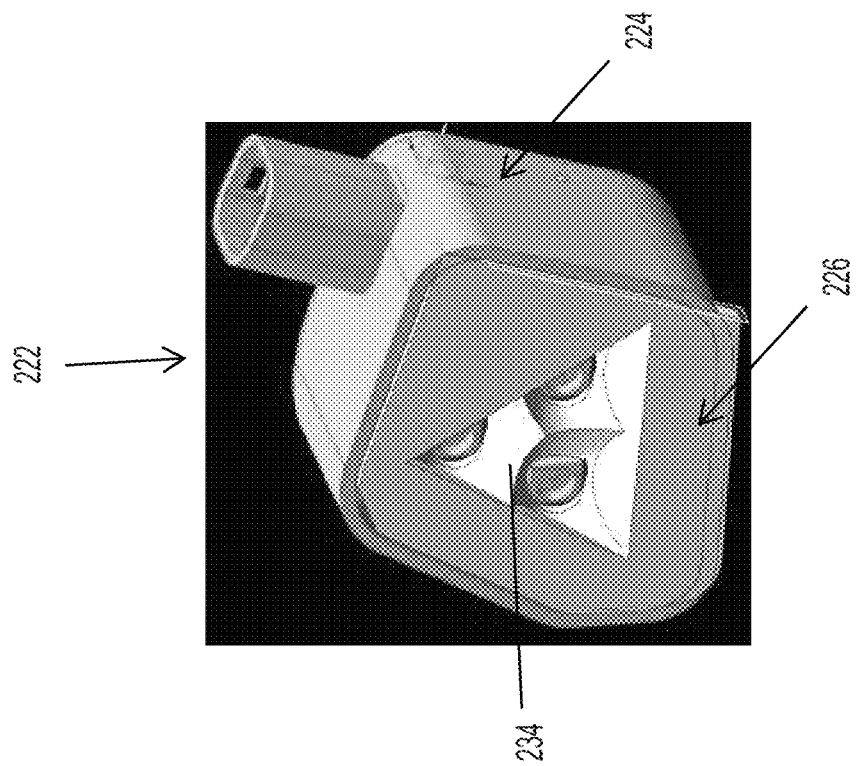
FIG. 28 is a perspective view of another indicator module of the present invention.
Figure 29:
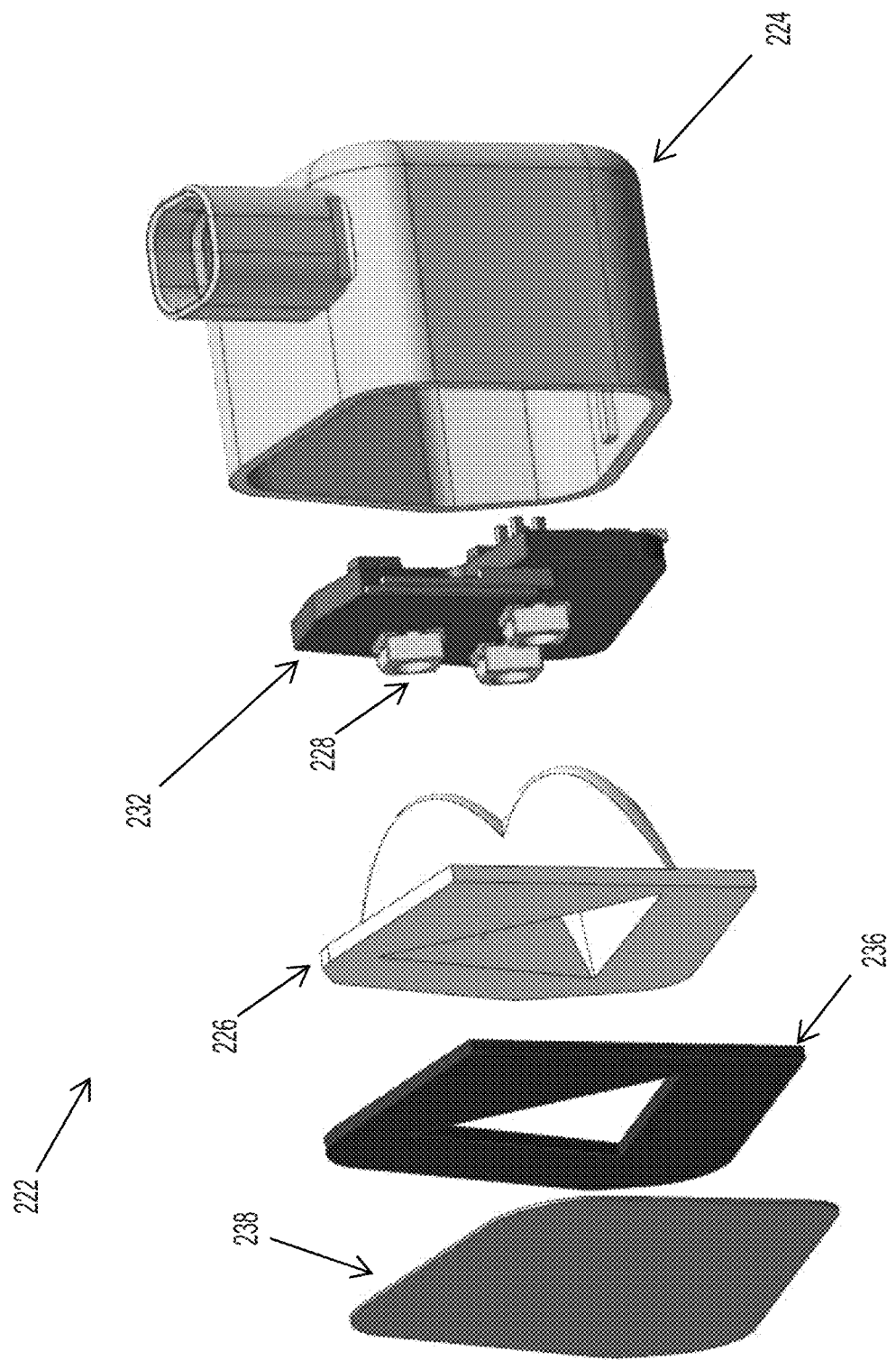
FIG. 29 is an exploded perspective view of the indicator module of FIG. 28.

In the illustrated embodiments of FIGS. 17-27, the LEDs are generally linearly arranged at the circuit board of the illumination module, but clearly the LEDs may be otherwise arranged depending on the particular application of the illumination module. For example, and with reference to FIGS. 28 and 29, an illumination module 222 includes a housing 224 (that is received into or attached to an indicator receiving portion or mounting portion or structure of the mirror back plate so as to be disposed generally at a rear surface of a planar portion of the back plate) and three light emitting diodes (LEDs) 228 arranged in a generally triangular manner, with the light emitting diode optionally being cooperatively or independently energized or powered for illuminating one or more icons (such as a respective icon associated with an individual LED) established at a mask 236 disposed at a front diffuser 238 of the indicator module. Signal indication module 222 includes a diffuser element 226 that has louvers 234 (FIG. 28) that are formed to angle or direct the light emitted by the light emitting diodes 228 in the desired manner. The triangle shape with louvers between the LEDs may help to scatter the light giving better uniformity of light emitted by the indicator module 222. The indicator module 222 may be otherwise similar to indicator modules 22, 122, 122' discussed above, such that a detailed discussion of the indicator modules need not be repeated herein.

The inner surface of the diffuser element may be polished to enhance reflection of the emitted light to enhance viewability of the icon through the mirror reflective element. Optionally, the polishing or surface finish of the diffuser element may be selected to provide the desired degree of reflectivity and light emittance by the indicator module. In order to reduce hot spots or the like, baffles (such as discussed above) may be disposed in front of the LEDs (and between the louvers). Optionally, the indicator module may be operable to provide a desired brightness or intensity of illumination and the desired directionality. The relative brightness of the LEDs may be balanced with current shunts and the LEDs may be driven with less current which may help to meet light reduction specifications without use of the baffles discussed above.

The back plate and/or signal indication module may be formed to provide a desired shape for viewing of the light passing through the reflective element or the mirror reflective element preferably includes one or more iconistic display areas or masks so that the illumination is viewable and discernible at the reflective element by the desired or targeted viewer. The mirror assembly thus may provide an iconistic display for an object detection/LCA system and/or an iconistic display for a turn signal indication, and/or may provide other displays or illumination devices, without affecting the scope of the present invention.

The indicator mounting portion may be angled so as to direct the light toward the vehicle and toward a driver or occupant of the host vehicle. More particularly, the light beam emitted from the blind spot signal indicating module and transmitted through the reflective element is angled so as to have its principle beam axis directed generally toward the eyes of a driver seated in the interior cabin of the host vehicle. The indicator mounting portion thus may extend from the rear of the back plate at an acute angle (such as approximately about 25 to about 30 degrees or thereabouts) relative to the plane defined by the back plate so as to direct or guide light through the passageway and in the desired direction toward the side of the equipped/host vehicle for viewing the object/LCA indication principally or solely by the driver of the host vehicle. Should, however, the signal module be a turn signal module, then the indicator mounting portion may extend from the rear of the back plate at an acute angle (such as approximately about 55 to about 60 degrees or thereabouts) relative to the plane defined by the back plate so as to direct or guide light through the passageway and in the desired direction away from the side of the equipped/host vehicle for viewing the turn indication principally or solely by the drivers of overtaking vehicles and principally other than by the driver of the host vehicle.

Optionally, it is envisioned that the signal indication module may be formed at an angle that is suitable for either application (blind spot alert and turn signal indication), such as about 30 degrees or thereabouts relative to the rear surface of the mirror substrate. With such a construction, a common module may be used for either application by flipping the module or reversing the module so that in one position, the module is angled so as to direct illumination toward the driver of the subject vehicle and in the other position, the module is angled so as to direct illumination toward drivers of other vehicles approaching or overtaking the subject vehicle. The indicia element may be reversed as well (depending on the icon or indicia established thereon) or may be selected and added for the particular application (for example, a warning icon may be provided on modules adapted for use as a blind spot alert while a chevron symbol or the like may be provided on modules adapted for use as a turn signal indicator). Thus, the different modules may have common molded housings and cover elements and circuitry, and thus may be readily manufactured and supplied for the particular applications of the vehicles.

The back plate may comprise any suitable back plate structure, and may be molded or formed, such as by injection molding, so as to provide the display receiving portion and a generally planar backing portion that attaches to the rear surface of the reflective element (such as via adhesive or other suitable attachment means). As shown in FIGS. 2-4, back plate 20 includes an aperture at the mounting portion such that when signal indication module 22 is attached to the mounting portion of back plate 20, the front end of housing 24 and the indicia element 36 of signal indication module 22 are positioned through the aperture and at or against the rear surface of the reflective element substrate. Preferably, back plate 20 is molded of a substantially dark or opaque or black material, such as from an ABS or polycarbonate polymeric resin material or from any other suitable material such as known in the exterior rearview mirror art, so as to be substantially opaque such that light does not pass through the opaque back plate and the indicator mounting portion.

Optionally, and desirably, the indicator mounting portion may be unitarily or integrally formed with back plate 20 and may be formed with a pocket for receiving or partially receiving housing 24 to locate signal indication module 22 at the generally planar backing portion of back plate 20. For example, the pocket may receive housing 24 at least partially therein, and the indicator mounting portion may secure (such as by snapping or the like) the housing at or in the pocket of the indicator mounting portion of back plate 20 (such as via tabs on the back plate engaging flanges or surfaces of the module housing to snap the signal indication module 22 to the back plate with the forward end of the housing and the indicia element urged toward and against the rear surface of the reflective element).

Optionally, the back plate may include a perimeter framing portion or bezel portion that extends around the perimeter edges of the reflective element to support the reflective element and frame the reflective element at the mirror assembly (such as by utilizing aspects of the mirror assemblies described in U.S. Pat. Nos. 8,058,977 and/or 7,581,859, which are hereby incorporated herein by reference in their entireties). The perimeter bezel portion may be narrow or small depending on the particular application of the reflective element and mirror reflector sub-assembly. Optionally, the mirror reflector sub-assembly may comprise a bezelless or frameless reflective element (such as the types described in U.S. Publication No. US-2006-0061008 and/or U.S. Pat. Nos. 7,184,190 and/or 7,255,451, and/or International Publication No. WO 2006/124682, which are hereby incorporated herein by reference in their entireties), whereby the back plate may not include a perimeter framing portion or bezel portion around the perimeter of the reflective element.

Back plate 20 may include an attachment element or elements (such as an annular ring or tab or annular prongs or annular snaps or the like) formed or established at the rear of the backing portion for attaching the back plate 20 and reflective element 18 to a mirror actuator (such as a mirror actuator as known in the art and/or as described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and/or 5,900,999, which are hereby incorporated herein by reference herein in their entireties), which is adjustable or operable to adjust a viewing angle of the mirror reflective element. When the mirror reflective element is canted or angled partially toward the driver of the host vehicle (which is typically the orientation of the reflective element during use so as to provide a generally rearward field of view to the driver of the host vehicle), there is sufficient space within the mirror casing at or near the outboard portion of the mirror assembly for the indicator mounting portion and signal indication module. The back plate and signal indication module of the present invention thus utilizes the space within the mirror head or casing that is already available and typically not used or occupied by other components.

Optionally, and preferably, indicator element or display element or signal indication module may snap into the end or pocket of the indicator mounting portion or may otherwise be attached or stuck at the indicator mounting portion, and may have a gasket or seal at the signal indication module to provide a substantially water proof or water resistant or water tight seal at the signal indication module, whereby the signal indication module may be sealed at the indicator mounting portion, such as by gluing or pressing or screwing or gasketing or hermetically sealing or otherwise substantially sealing the signal indication module at the indicator mounting portion. The signal indication module may comprise a self-contained, unitary, sealed or substantially sealed, indicator module that includes the housing and cover element, an illumination source (such as one or more LEDs or the like), a DC converter with a voltage dropping resistor (such as described in U.S. Pat. Nos. 7,195,381; 6,902,284 and/or 6,690,268, which are hereby incorporated herein by reference in their entireties) and the electrical terminals or connector. The signal indication module thus may be connected to a power source and may be activated or energized to illuminate the display for viewing by the driver of the vehicle. Optionally, the electrical connections to the signal indication module may be made while the signal indication module is attached to the mirror assembly, such as via a plug and socket type arrangement or configuration, and such as by utilizing aspects of the mirror assembly described in U.S. Pat. No. 6,669,267, which is hereby incorporated herein by reference in its entirety. The unitary signal indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties.

The blind spot indicators of the present invention thus are operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786 and/or 5,786,772, and/or of the reverse or backup aid systems, such as the rearwardly directed vehicle vision systems described in U.S. Pat. Nos. 5,550,677; 5,760,962; 5,670,935; 5,877,897; 6,201,642; 6,396,397; 6,498,620; 6,717,610; 6,757,109 and/or 7,005,974, and/or of the automatic headlamp controls described in U.S. Pat. Nos. 7,526,103; 5,796,094 and/or 5,715,093, and/or of the rain sensors described in U.S. Pat. Nos. 6,250,148 and/or 6,341,523, and/or of other imaging systems, such as the types described in U.S. Pat. Nos. 6,353,392 and/or 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962 and/or 5,796,094, and/or International Publication No. WO 2004/047421, with all of the above referenced U.S. patents and PCT applications being commonly assigned and being hereby incorporated herein by reference in their entireties.

The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 7,626,749; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,712,879; 7,195,381 and/or 7,255,451, and/or International Publication No. WO 2006/124682, which are all hereby incorporated herein by reference in their entireties.

Optionally, the reflective element may include a perimeter metallic band, such as the types described in U.S. Pat. Nos. 7,255,451 and 7,274,501, and International Publication Nos. WO 2004/026633 and/or WO 2004/042457, which are all hereby incorporated herein by reference in their entireties. Optionally, the reflective element may include indicia formed at and viewable at the reflective element, such as by utilizing aspects of the reflective elements described in U.S. Pat. No. 7,626,749, which is hereby incorporated herein by reference in its entirety.

Optionally, the reflective element may comprise a single substrate with a reflective coating at its rear surface, without affecting the scope of the present invention. The mirror assembly thus may comprise a prismatic mirror assembly or planar or non-planar mirror or other mirror having a single substrate reflective element, such as a mirror assembly utilizing aspects described in U.S. Pat. Nos. 7,249,860; 6,318,870; 6,598,980; 5,327,288; 4,948,242; 4,826,289; 4,436,371 and/or 4,435,042, and/or International Publication No. WO 2004/103772, which are hereby incorporated herein by reference in their entireties. Optionally, the reflective element may comprise a conventional prismatic or flat reflective element or prism, or may comprise a prismatic or flat reflective element of the types described in International Publication Nos. WO 2004/026633 and/or WO 2004/103772, and/or U.S. Pat. Nos. 7,420,756; 7,249,860; 7,255,451 and/or 7,338,177, which are all hereby incorporated herein by reference in their entireties, without affecting the scope of the present invention.

Changes and modifications to the specifically described embodiments may be carried out without departing from the principles of the present invention, which is intended to be limited only by the scope of the appended claims as interpreted according to the principles of patent law.

The invention claimed is:

1. A mirror reflective element sub-assembly suitable for use for an exterior rearview mirror assembly of a vehicle, said mirror reflective element sub-assembly comprising:
    a mirror reflective element;
    a mirror back plate formed in a plastic injection molding operation;
    wherein said mirror back plate comprises an aperture formed therethrough;
    said mirror back plate comprising a front side and an opposing rear side;
    wherein said front side of said mirror back plate is attached at a rear side of said mirror reflective element;
    a blind zone indication module comprising a circuit element with circuitry disposed thereat, wherein said circuitry comprises at least one light emitting diode that is electrically activatable to emit light;
    said blind zone indication module comprising a diffuser element;
    said rear side of said mirror back plate comprising an indicator receiving portion;
    wherein said indicator receiving portion is located at said aperture of said mirror back plate;
    wherein said blind zone indication module attaches at the rear side of said mirror reflective element via said aperture of said mirror back plate;
    wherein said blind zone indication module includes a housing that houses said circuit element and said at least one light emitting diode therein;
    wherein said rear side of said mirror back plate comprises structure at said indicator receiving portion that at least partially receives said housing;
    wherein said housing comprises side walls that, with said housing at least partially received at said structure at said indicator receiving portion, protrude from the rear side of said mirror reflective element;
    wherein said circuit element comprises a plurality of electrically conductive terminals in electrical connection with circuitry of said circuit element;
    wherein said plurality of electrically conductive terminals are received at a connector portion of said housing;
    wherein said connector portion extends from a side wall of said housing;
    wherein said connector portion of said housing and said plurality of electrically conductive terminals extend over the rear side of said mirror reflective element;
    wherein said connector portion of said housing is configured to connect to a wire harness of an exterior rearview mirror assembly to electrically power circuitry of said circuit element when said mirror reflective element sub-assembly is disposed at the exterior rearview mirror assembly and when the exterior rearview mirror assembly is mounted and used on a vehicle; and
    wherein a portion of said blind zone indication module partially but not fully occludes light emitted by said at least one light emitting diode to reduce a bright spot at said mirror reflective element when said mirror reflective element sub-assembly is disposed at the exterior rearview mirror assembly and when the exterior rearview mirror assembly is mounted and used on the vehicle and when said mirror reflective element sub-assembly is viewed by a driver of the vehicle when said at least one light emitting diode of said blind zone indication module is activated.

2. The mirror reflective element sub-assembly of claim 1, wherein said blind zone indication module adhesively attaches at the rear side of said mirror reflective element via said aperture of said mirror back plate.

3. The mirror reflective element sub-assembly of claim 2, wherein said structure at said indicator receiving portion is configured for said housing to snap-attach thereat.

4. The mirror reflective element sub-assembly of claim 1, wherein said housing comprises an inner surface, and wherein said inner surface comprises a diffusely light reflecting surface for reflecting light incident thereon to enhance the intensity of light that exits said blind zone indication module.

5. The mirror reflective element sub-assembly of claim 1, wherein said blind zone indication module comprises an indicia element, and wherein light emitted by said at least one light emitting diode is transmitted through said indicia element when said at least one light emitting diode is activated.

6. The mirror reflective element sub-assembly of claim 5, wherein said indicia element is associated with a blind spot detection system of the vehicle at which said mirror reflective element sub-assembly is disposed and used.

7. The mirror reflective element sub-assembly of claim 1, wherein said blind zone indication module comprises a pair of light emitting diodes, and wherein each light emitting diode is associated with a respective icon of an indicia element disposed at an end portion of said blind zone indication module at which said blind zone indication module attaches at said mirror reflective element.

8. The mirror reflective element sub-assembly of claim 1, wherein said blind zone indication module comprises a plurality of light emitting diodes and louvers established between adjacent light emitting diodes of said plurality of light emitting diodes.

9. The mirror reflective element sub-assembly of claim 8, wherein said louvers comprise first and second louvers arranged parallel to one another and between respective pairs of said plurality of light emitting diodes.

10. The mirror reflective element sub-assembly of claim 8, wherein said plurality of light emitting diodes comprises three triangularly arranged light emitting diodes, and wherein said louvers comprise first, second and third louvers established between respective pairs of said three triangularly arranged light emitting diodes.

11. The mirror reflective element sub-assembly of claim 1, wherein said blind zone indication module snap attaches at said structure of said mirror back plate that at least partially circumscribes said aperture formed through said mirror back plate.

12. The mirror reflective element sub-assembly of claim 1, wherein said circuitry is operable to electrically power said at least one light emitting diode, and wherein said circuitry provides overvoltage protection.

13. The mirror reflective element sub-assembly of claim 1, wherein a heater element is disposed between said front side of said mirror back plate and the rear side of said mirror reflective element, and wherein said heater element comprises an aperture therethrough that corresponds to said aperture of said mirror back plate when said mirror back plate is attached at the rear side of said mirror reflective element.

14. A mirror reflective element sub-assembly suitable for use for an exterior rearview mirror assembly of a vehicle, said mirror reflective element sub-assembly comprising:
 a mirror reflective element;
 a mirror back plate formed in a plastic injection molding operation;
 wherein said mirror back plate comprises an aperture formed therethrough;
 said mirror back plate comprising a front side and an opposing rear side;
 wherein said front side of said mirror back plate is attached at a rear side of said mirror reflective element;
 a blind zone indication module comprising a circuit element with circuitry disposed thereat, wherein said circuitry comprises a plurality of light emitting diodes;
 wherein louvers are established between adjacent light emitting diodes of said plurality of light emitting diodes;
 said blind zone indication module comprising a diffuser element;
 said rear side of said mirror back plate comprising an indicator receiving portion;
 wherein said indicator receiving portion is located at said aperture of said mirror back plate;
 wherein said blind zone indication module attaches at the rear side of said mirror reflective element via said aperture of said mirror back plate;
 wherein said blind zone indication module includes a housing that houses said circuit element and said plurality of light emitting diodes therein;
 wherein said rear side of said mirror back plate comprises structure at said indicator receiving portion that at least partially receives said housing;
 wherein said housing comprises side walls that, with said housing at least partially received at said structure at said indicator receiving portion, protrude from the rear side of said mirror reflective element;
 wherein said circuit element comprises a plurality of electrically conductive terminals in electrical connection with circuitry of said circuit element;
 wherein said plurality of electrically conductive terminals is disposed at a connector portion of said housing and is accessible thereat;
 wherein said connector portion extends from a side wall of said housing;
 wherein said connector portion of said housing and said plurality of electrically conductive terminals extend over the rear side of said mirror reflective element;
 wherein said connector portion of said housing is configured to connect said plurality of electrically conductive terminals to a wire harness of an exterior rearview mirror assembly to electrically power circuitry of said circuit element when said mirror reflective element sub-assembly is disposed at the exterior rearview mirror assembly and when the exterior rearview mirror assembly is mounted and used on a vehicle; and
 wherein a heater element is disposed between said front side of said mirror back plate and the rear side of said mirror reflective element, and wherein said heater element comprises an aperture therethrough that corresponds to said aperture of said mirror back plate when said mirror back plate is attached at the rear side of said mirror reflective element.

15. The mirror reflective element sub-assembly of claim 14, wherein a portion of said blind zone indication module partially but not fully occludes light emitted by said plurality of light emitting diodes to reduce a bright spot at said mirror reflective element when said mirror reflective element sub-assembly is disposed at the exterior rearview mirror assembly and when the exterior rearview mirror assembly is mounted and used on the vehicle and when said mirror reflective element sub-assembly is viewed by a driver of the vehicle when said plurality of light emitting diodes of said blind zone indication module is activated.

16. The mirror reflective element sub-assembly of claim 14, wherein said blind zone indication module comprises an indicia element, and wherein light emitted by said plurality of light emitting diodes is transmitted through said indicia element when said plurality of light emitting diodes is activated, and wherein said indicia element is associated with a blind spot detection system of the vehicle at which said mirror reflective element sub-assembly is disposed and used.

* * * * *